US008715849B2

(12) United States Patent
Takita et al.

(10) Patent No.: US 8,715,849 B2
(45) Date of Patent: May 6, 2014

(54) MICROPOROUS POLYMER MEMBRANE

(75) Inventors: Kotaro Takita, Nasusiobara (JP); Shintaro Kikuchi, Saitama (JP)

(73) Assignee: Toray Battery Separator Film Co., Ltd. (JP)

( * ) Notice: Subject to any disclaimer, the term of this patent is extended or adjusted under 35 U.S.C. 154(b) by 840 days.

(21) Appl. No.: 11/868,265

(22) Filed: Oct. 5, 2007

(65) Prior Publication Data

US 2009/0092893 A1   Apr. 9, 2009

(51) Int. Cl.
   H01M 2/14   (2006.01)
   H01M 2/16   (2006.01)
   H01M 2/18   (2006.01)

(52) U.S. Cl.
   USPC ............ 429/145; 429/144; 429/247; 429/254

(58) Field of Classification Search
   USPC ............................. 429/34, 144, 145, 247, 254
   See application file for complete search history.

(56) References Cited

U.S. PATENT DOCUMENTS

| | | | |
|---|---|---|---|
| 6,824,865 B1 | 11/2004 | Funaoka et al. | |
| 2004/0213985 A1* | 10/2004 | Lee et al. | 428/315.7 |
| 2005/0031943 A1* | 2/2005 | Call | 429/144 |
| 2005/0098913 A1* | 5/2005 | Funaoka et al. | 264/41 |
| 2006/0103055 A1 | 5/2006 | Hoshuyama et al. | |
| 2006/0127753 A1* | 6/2006 | Nakashima et al. | 429/142 |
| 2007/0037047 A1 | 2/2007 | Ohashi et al. | |

FOREIGN PATENT DOCUMENTS

| | | |
|---|---|---|
| EP | 1693408 A1 * | 8/2006 |
| JP | 6-240036 | 8/1994 |
| JP | 06-240036 | 8/1994 |
| JP | 11060792 A * | 3/1999 |
| JP | 2002-194132 | 7/2002 |
| JP | 2004-196870 | 7/2004 |
| JP | 2007-063547 | 3/2007 |
| JP | 2010-525544 | 7/2010 |
| WO | WO 99/48959 | 9/1999 |
| WO | WO 00/20492 | 4/2000 |
| WO | WO 02/072248 | 9/2002 |
| WO | WO 2005/113657 | 12/2005 |
| WO | 2007/015547 A1 | 2/2007 |
| WO | WO 2007/117042 | 10/2007 |
| WO | WO 2008/016174 | 2/2008 |
| WO | 2009/038229 A1 | 3/2009 |

OTHER PUBLICATIONS

Ihm et al., Effect of polymer blending and drawing conditions on properties of polyethylene separator prepared for Li-ion secondary battery, Mar. 2002, J. Power Sources, 109, 388-393.*
Fujii et al., Machine translation of JP 11-060792 A, Mar. 1999.*

* cited by examiner

*Primary Examiner* — Sean P Cullen
(74) *Attorney, Agent, or Firm* — DLA Piper LLP (US)

(57) ABSTRACT

The invention relates to a microporous membrane which comprises polyethylene, the microporous membrane having a differential pore volume curve with an area under the curve over the range of pore diameters of from about 100 nm to about 1,000 nm that is 25% or more of a total area under the curve over the range of pore diameters of from about 10 nm to about 1,000 nm.

10 Claims, 4 Drawing Sheets

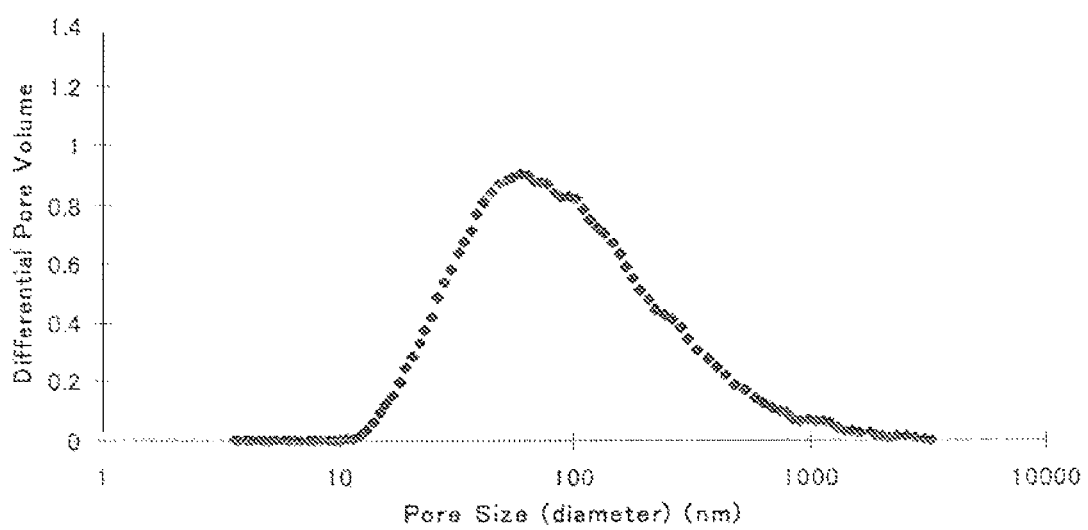

MICROPOROUS POLYMER MEMBRANE

FIELD OF THE INVENTION

The present invention relates to a microporous membrane comprising one or more polymer, the membrane having suitable permeability, mechanical strength, heat shrinkage resistance, compression resistance and electrolytic solution absorption. The invention also relates to a method for producing such a microporous membrane, a method for producing a battery using such a membrane as a battery separator, and a method for using such a battery as a source of sink of electric charge.

BACKGROUND OF THE INVENTION

Microporous membranes are useful as separators to prevent electrode contact in, e.g., electrochemical cells such as fuel cells and batteries. For example, microporous membranes can be used as separators in primary and secondary batteries such as lithium ion secondary batteries, lithium-polymer secondary batteries, nickel-hydrogen secondary batteries, nickel-cadmium secondary batteries, nickel-zinc secondary batteries, silver-zinc secondary batteries, etc. When the microporous polyolefin membrane is used as a battery separator, particularly as a lithium ion battery separator, the membrane's performance significantly affects the battery's properties, productivity, and safety. Accordingly, the microporous polyolefin membrane should have appropriate permeability, mechanical properties, heat resistance, dimensional stability, shutdown properties, meltdown properties, etc. As is known, it is desirable for the batteries to have a relatively low shutdown temperature and a relatively high meltdown temperature for improved battery safety properties, particularly for batteries exposed to high temperatures during under operating conditions. High separator permeability is desirable for high capacity of batteries. A separator with high mechanical strength is more durable, and is also desirable for improved battery assembly and fabrication properties.

The optimization of material compositions, stretching conditions, heat treatment conditions, etc., has been proposed to improve the properties of microporous polyolefin membranes used as battery separators. For example, JP6-240036A discloses a microporous polyolefin membrane having improved pore diameter and a singular pore diameter distribution. The membrane is made from a polyethylene resin containing 1% or more by mass of ultra-high-molecular-weight polyethylene having a weight-average molecular weight ("Mw") of $7 \times 10^5$ or more, the polyethylene resin having a molecular weight distribution (weight-average molecular weight/number-average molecular weight) of 10-300, and the microporous polyolefin membrane having a porosity of 35-95%, an average penetrating pore diameter of 0.05-0.2 µm, a rupture strength (15-mm width) of 0.2 kg or more, and a pore diameter distribution (maximum pore diameter/average penetrating pore diameter) of 1.5 or less. This microporous membrane is produced by extruding a melt-blend of the above polyethylene resin and a membrane-forming solvent through a die, stretching a gel-like sheet obtained by cooling at a temperature from the crystal dispersion temperature ("Tcd") of the above polyethylene resin to the melting point+10° C., removing the membrane-forming solvent from the gel-like sheet, re-stretching the resultant membrane to 1.5-3 fold as an area magnification at a temperature of the melting point of the above polyethylene resin −10° C. or less, and heat-setting it at a temperature from the crystal dispersion temperature of the above polyethylene resin to the melting point.

WO 1999/48959 discloses a microporous polyolefin membrane having suitable strength and permeability, as well as a uniformly porous surface without local permeability variations. The membrane is made of a polyolefin resin, for instance, high-density polyethylene, having Mw of 50,000 or more and less than 5,000,000, and a molecular weight distribution of 1 or more to less than 30, which has a network structure with fine gaps formed by uniformly dispersed micro-fibrils, having an average micro-fibril size of 20-100 nm and an average micro-fibril distance of 40-400 nm. This microporous membrane is produced by extruding a melt-blend of the above polyolefin resin and a membrane-forming solvent through a die, stretching a gel-like sheet obtained by cooling at a temperature of the melting point of the above polyolefin resin −50° C. or higher and lower than the melting point, removing the membrane-forming solvent from the gel-like sheet, re-stretching it to 1.1-5 fold at a temperature in the range of the melting point of the above polyolefin resin −50° C. up to the melting point, and heat-setting it at a temperature from the crystal dispersion temperature of the above polyolefin resin to the melting point.

WO 2000/20492 discloses a microporous polyolefin membrane of improved permeability which is characterized by fine polyethylene fibrils having Mw of $5 \times 10^5$ or more or a composition comprising such polyethylene. The microporous polyolefin membrane has an average pore diameter of 0.05-5 µm, and the percentage of lamellas at angles θ of 80-100° relative to a membrane surface is 40% or more in longitudinal and transverse cross sections. This polyethylene composition comprises 1-69% by weight of ultra-high-molecular-weight polyethylene having a weight-average molecular weight of $7 \times 10^5$ or more, 98-1% by weight of high-density polyethylene, and 1-30% by weight of low-density polyethylene. This microporous membrane is produced by extruding a melt-blend of the above polyethylene or its composition and a membrane-forming solvent through a die, stretching a gel-like sheet obtained by cooling, heat-setting it at a temperature from the crystal dispersion temperature of the above polyethylene or its composition to (melting point+30° C.), and removing the membrane-forming solvent.

WO 2002/072248 discloses a microporous membrane having improved permeability, particle-blocking properties and strength. The membrane is made using a polyethylene resin having Mw of less than 380,000. The membrane has a porosity of 50-95%, an average pore diameter in the range of 0.01-1 µm. The microporous membrane has a three-dimensional network skeleton formed by micro-fibrils having a average diameter of 0.2-1 µm connected to each other throughout the overall microporous membrane, and openings defined by the skeleton to have an average diameter of 0.1 µm or more and less than 3 µm. This microporous membrane is produced by extruding a melt-blend of the above polyethylene resin and a membrane-forming solvent through a die, removing the membrane-forming solvent from a gel-like sheet obtained by cooling, stretching it to 2-4 fold at a temperature of 20-140° C., and heat-treating the stretched membrane at a temperature of 80-140° C.

It has been suggested that modifying the internal structure of the membrane could potentially have a favorable impact on at least some of the desired membrane properties. In this regard, it has been proposed to produce the membrane from compositions which include inorganic oxides such as silicon oxides, which can then be leached out of the finished membrane with an inorganic base. Such methods are not desired since they would inevitably leave an undesirable residue of the silicon oxides in the membrane.

WO 2005/113657 discloses a microporous polyolefin membrane having suitable shutdown properties, meltdown properties, dimensional stability, and high-temperature strength. The membrane is made using a polyolefin composition comprising (a) a polyethylene resin containing 8-60% by mass of a component having a molecular weight of 10,000 or less, and an Mw/Mn ratio of 11-100, wherein Mn is the number-average molecular weight of the polyethylene resin, and a viscosity-average molecular weight ("Mv") of 100,000-1,000,000, and (b) polypropylene. The membrane has a porosity of 20-95%, and a heat shrinkage ratio of 10% or less at 100° C. This microporous polyolefin membrane is produced by extruding a melt-blend of the above polyolefin and a membrane-forming solvent through a die, stretching a gel-like sheet obtained by cooling, removing the membrane-forming solvent, and annealing the sheet.

Battery separator properties, such as permeability, mechanical strength, dimensional stability, thermal expansion, shutdown properties and meltdown properties are generally considered important. In addition to these properties, separator properties related to battery productivity such as electrolytic solution absorption, and battery cyclability, such as electrolytic solution retention properties, are also considered to be important. It can be important to simultaneously balance or optimize two or more of these properties, such as thermal expansion and electrolyte retention. For example, electrodes for lithium ion batteries expand and shrink according to the intrusion and departure of lithium, and an increase in battery capacity leads to larger expansion ratios. Because separators are compressed when the electrodes expand, it is desired that the separators when compressed suffer as little a decrease as possible in electrolytic solution retention.

Moreover, even though improved microporous membranes are disclosed in JP6-240036A, WO 1999/48959, WO 2000/20492, WO 2002/072248, and WO 2005/113657, further improvements are still needed particularly in membrane permeability, mechanical strength, heat shrinkage resistance, compression resistance, and electrolytic solution absorption properties. It is thus desired to form battery separators from microporous membranes having improved permeability, mechanical strength, heat shrinkage resistance, compression resistance and electrolytic solution absorption.

SUMMARY OF THE INVENTION

In an embodiment, the invention relates to the discovery of a microporous membrane having improved permeability, mechanical strength, heat shrinkage resistance, compression resistance and electrolytic solution absorption properties. A microporous membrane has been discovered which has a sufficient number of pores having a pore size in the range of about 100 nm to about 1000 nm to achieve the desired amount of electrolytic solution absorption and a sufficient number of pores having a pore size in the range of about 1 nm to about 100 nm so that the strength of the microporous membrane is not significantly degraded.

In an embodiment, the invention relates to a microporous polyolefin membrane comprising pores characterized by a pore size distribution such at least about 25% of the area under the differential pore volume curve is associated with pores having a diameter in the range of about 100 nm to about 1,000 nm.

In this context, differential pore volume is expressed as $$\frac{dVp}{d\text{Log}(r)}$$

where Vp is the pore volume, and r is the pore radius. Log r is the base 10 logarithm of the radius r. It is convenient to plot the curve as a function of the logarithm of the pore diameter.

In a related embodiment, the curve of differential pore volume as a function of pore size (e.g., pore diameter when the pores are approximately cylindrical) is multi-modal, i.e., it is characterized by at least two peaks. It has been discovered that such a membrane has improved permeability, mechanical strength, heat shrinkage resistance, compression resistance and electrolytic solution absorption characteristics. The microporous membrane can be obtained by extruding a polyolefin solution through one or more dies.

The polyolefin solution can be produced from one or more diluents and polyolefin resin. The polyolefin solution can be produced from polyethylene resin.

In an embodiment, the polyethylene resins comprise
(a) a first polyethylene resin having a weight-average molecular weight in the range of about $1 \times 10^4$ to about $5 \times 10^5$; and
(b) 7% or less by mass of a second polyethylene resin, the second polyethylene resin having a weight-average molecular weight of $1 \times 10^6$ or more; the mass percents being based on the combined mass of resins (a) and (b).

In another embodiment, the polyolefin solution is produced from polyethylene resin and polypropylene resin. For example, the polyolefin solution can be produced from (c) 25% or less by mass of a polypropylene resin, the mass percent being based on the combined mass of the (a) first and (b) second polyethylene and the mass of (c) polypropylene in the polyolefin solution. In an embodiment the polyolefin resin consists essentially of the polyethylene (e.g., the first polyethylene); in another embodiment, the polyethylene resin consists essentially of the polyethylene. The portion of the polyolefin solution that is not polyolefin can be diluent and/or additives, some of which are described below.

After the polyolefin solution is extruded, it can be cooled to make a cooled extrudate, which can be in the form of a gel-like molding or sheet for example. The extrudate or cooled extrudate can be stretched in at least one direction, and at least a portion of the diluent removed in order to form a porous sheet. The porous sheet can be stretched at an elevated temperature to a magnification ranging from 1.1 to 1.8 fold in at least one direction to form a stretched porous sheet. This step of stretching the porous sheet can be referred to as a "second" stretching step to distinguish is from the step of stretching the extrudate or cooled extrudate. Accordingly, the elevated temperature during the second stretching step can be referred to as the second stretching temperature. Following the second stretching, the stretched porous sheet can be heat-set at a heat-setting temperature in a range of the second stretching temperature ±6° C. in order to form the microporous membrane. In an embodiment, the heat-setting temperature in a range of the second stretching temperature ±5° C., or ±3° C., or ±2° C.

In an embodiment, the microporous polyolefin membrane is characterized by a differential pore volume curve (sometimes referred to conventionally as a pore size distribution curve) having at least two modes. One mode or peak generally is associated with dense domains in the membrane having pore sizes of about 0.01 to about 0.08 µm. At least a second mode corresponds to coarser domains having pore sizes a range of about 0.08 µm to about 1.5 µm. See FIGS. 1 and 2, for example. The modes may be present as distinct peaks in the differential pore volume curve, but this is not required since the modes can manifest themselves as shoulders or inflections on the curve depending, e.g., on the level of resolution selected for the pore size measurement, the rate of mercury intrusion, the amount of pressure applied, etc. In an embodiment, the pore volume ratio of the dense domains (relatively small pores) to the coarse domains relatively (large pores) is 0.5 to 49. In an embodiment, the microporous polyolefin membrane has surface roughness of in the range of about $3\times10^2$ nm to about $3\times10^3$ nm. It is believed that membranes having a surface roughness within this range have a sufficiently large contact area with an electrolytic solution when used as a battery separator, exhibiting suitable electrolytic solution absorption characteristics.

In an embodiment, the microporous polyolefin membrane is made by a method comprising the steps of (1) melt-blending (a) a polyethylene resin containing 7% or less by mass of ultra-high-molecular-weight polyethylene having a weight-average molecular weight of $1\times10^6$ or more based on the mass of the polyethylene resin and (b) a membrane-forming solvent, in order to form a polyolefin solution, with the solution preferably having a solvent concentration of 25-50% by mass based on the mass of the polyolefin solution, (2) extruding the polyolefin solution through a die to form an extrudate, (3) cooling the extrudate to form a gel-like sheet, (4) stretching the gel-like sheet at a first stretching temperature in a range of the crystal dispersion temperature ("Tcd") of the polyethylene resin to Tcd+30° C., (5) removing the membrane-forming solvent from the stretched gel-like sheet to form a membrane, (6) stretching the membrane to a magnification of 1.1to 1.8 fold in at least one direction at a second stretching temperature to form a stretched membrane, and (7) heat-setting the stretched membrane at a heat-setting temperature in the range of Tcd to Tm in order to form the microporous polyolefin membrane.

for the sample of Example 3. The total area under the curve over the range of pores sizes from about 1 nm to about 1000 nm is 1. The area under the curve over the range of pores sizes from about 100 nm to about 1000 nm is 0.43. Accordingly, about 43% of the area under the curve is associated with pores having pore sizes in the range of about 100 to about 1000 nm.

Figure 2:
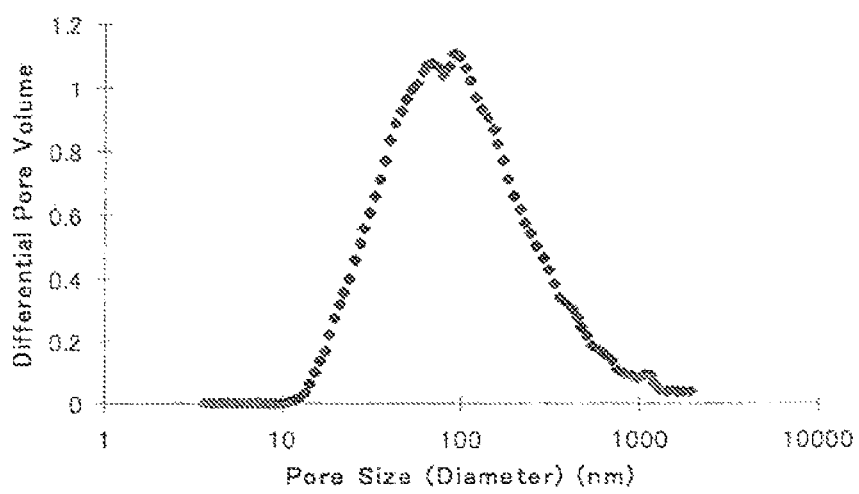

FIG. 2 shows the differential pore volume curve $$\frac{dVp}{d\text{Log}(r)}$$

for the sample of Example 7. The total area under the curve over the range of pores sizes from about 1 nm to about 1000 nm is 1.07. The area under the curve over the range of pores sizes from about 100 nm to about 1000 nm is 0.502. Accordingly, about 47% of the area under the curve is associated with pores having pore sizes in the range of about 100 to about 1000 nm.

Figure 3:
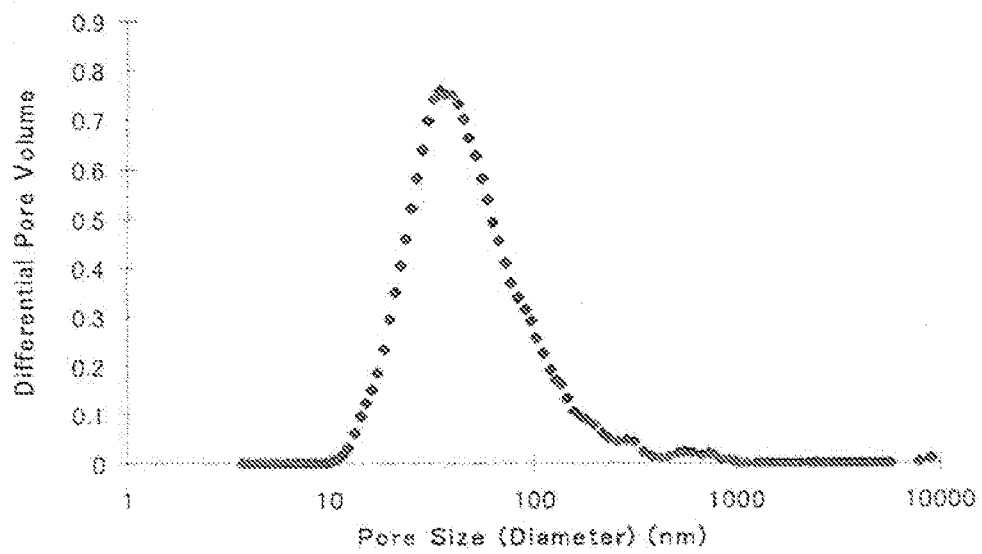

FIG. 3 shows the differential pore volume curve $$\frac{dVp}{d\text{Log}(r)}$$

for the sample of Comparative Example 2. The total area under the curve over the range of pores sizes from about 1 nm to about 1000 nm is 0.48. The area under the curve over the range of pores sizes from about 100 nm to about 1000 nm is 0.075. Accordingly, about 16% of the area under the curve is associated with pores having pore sizes in the range of about 100 to about 1000 nm.

Figure 4:
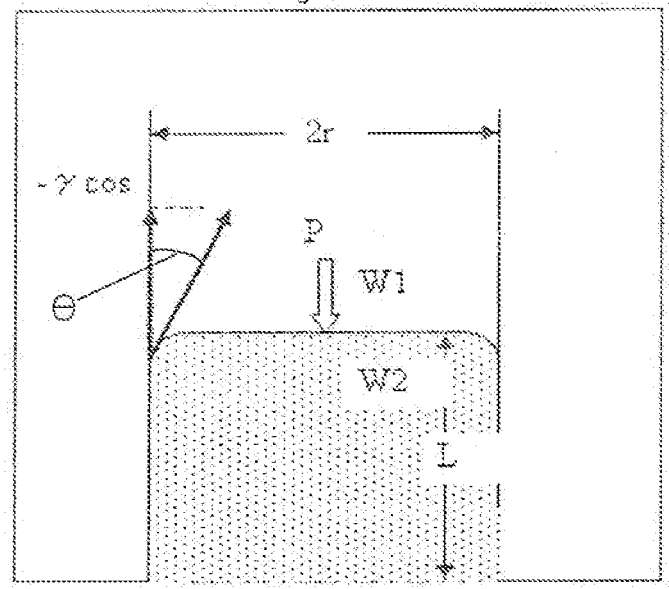

FIG. 4 shows illustrates mercury intrusion porosimetry.

Figure 5:
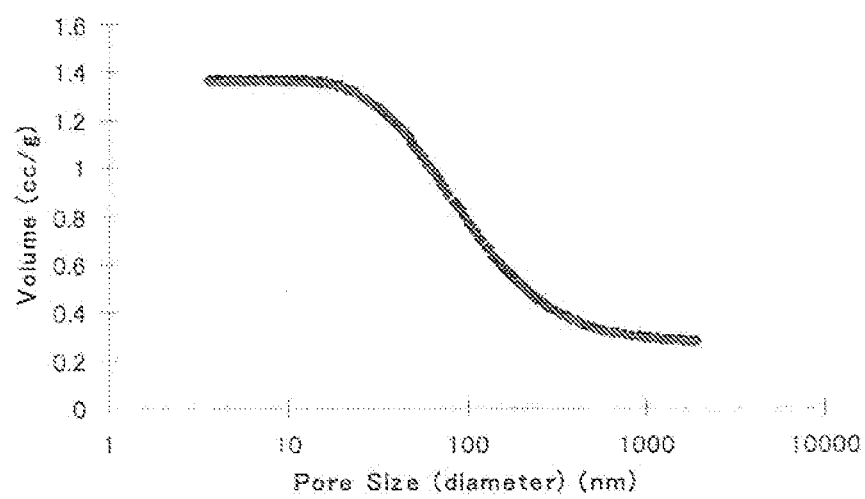

FIG. 5 shows a Vp (pore volume) curve for a microporous membrane having a hybrid structure (from Example 7).

Figure 6:
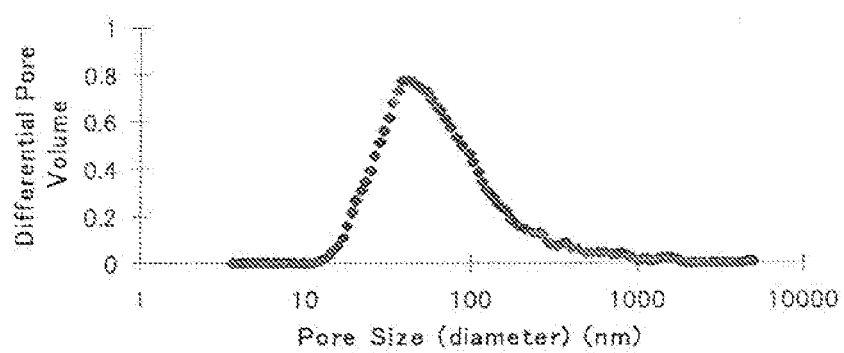

FIG. 6 shows the differential pore volume curve $$\frac{dVp}{d\text{Log}(r)}$$

for a microporous membrane that does not have a hybrid structure. The membrane contains polyethylene but no polypropylene.

FIG. 7 shows the differential pore volume curve $$\frac{dVp}{d\text{Log}(r)}$$

for a microporous membrane that has a hybrid structure.

DETAILED DESCRIPTION OF THE INVENTION

[1] Production of the Melt

The present inventions relates to a method for making a microporous film having enhanced properties, especially electrolyte injection and compression properties. In an embodiment, certain specific polyethylene resins and, optionally, a certain specific polypropylene resin can be combined, e.g. by melt-blending, to form a polyolefin composition.

In one embodiment, the polyolefin composition comprises polyethylene, e.g., (a) a first polyethylene resin having a weight average molecular weight of from about $2.5\times10^5$ to about $5\times10^5$. In another embodiment, the polyolefin composition comprises polyethylene and polypropylene. In yet another embodiment, the polyolefin composition is produced from (a) the first polyethylene resin, (b) from about 0% to about 7%, of a second polyethylene resin having a weight average molecular weight of from about $5\times10^5$ to about $1\times10$, and (c) from 0% to about 25% polypropylene resin having a weight average molecular weight of from about $3\times10^5$ to about $1.5\times10^6$.

In yet another embodiment, the polyolefin composition is produced from polyethylene resin and 25% by mass to 65% by mass, or 30% to 55% by mass, of polypropylene resin, based on the mass of the polyolefin composition.

(a) Polyethylene Resins

The microporous membrane is produced from a polyolefin solution comprising diluent and polyolefin. The polyolefin can comprise polyethylene or optionally polyethylene and polypropylene. Non-limiting examples of suitable polyethylenes and polypropylenes will now be described.

(i) Composition

The first polyethylene has a weight average molecular weight Mw in the range of about $1\times10^4$ to about $5\times10^5$. The first polyethylene can comprise at least one of high-density polyethylene ("HDPE"), medium-density polyethylene, branched low-density polyethylene and linear low-density polyethylene. When the first polyethylene is HDPE, the Mw of the HDPE can range, e.g., from about $1\times10^5$ to about $5\times10^5$, or from about $2\times10^5$ to about $4\times10^5$.

The first polyethylene resin can be, for example, a high density polyethylene (HDPE) resin having a weight average molecular weight of from $2.5\times10^5$ to $5\times10^5$ and a molecular weight distribution of from about 5 to about 100. A non-limiting example of the first polyethylene resin for use herein is one that has a weight average molecular weight of from about $2.5\times10^5$ to about $4\times10^5$ and a molecular weight distribution of form about 7 to about 50. The first polyethylene resin can be an ethylene homopolymer, or an ethylene/α-olefin copolymer, such as, for example, one containing a small amount, e.g. about 5 mole %, of a third α-olefin. The third α-olefin, which is not ethylene, is preferably propylene, butene-1, pentene-1, hexene-1,4-methylpentene-1, octene-1, vinyl acetate, methyl methacrylate, or styrene or combinations thereof. Such copolymer is preferably produced using a single-site catalyst.

The second polyethylene resin, for example an ultra-high molecular weight polyethylene (UHMWPE) resin, has a weight average molecular weight that is greater than $5\times10^5$. The Mw of the second polyethylene can be, for example, in the range of about $1\times10^6$ to $15\times10^6$, or about $1\times10^6$ to $5\times10^6$, or about $1\times10^6$ to $3\times10$. The second polyethylene resin can be an ethylene homopolymer, or an ethylene/α-olefin copolymer, such as, for example, one containing a small amount, e.g. about 5 mole %, of a third α-olefin. The third α-olefin, which is not ethylene, can be, for example, propylene, butene-1, pentene-1, hexene-1,4-methylpentene-1, octene-1, vinyl acetate, methyl methacrylate, or styrene or combinations thereof. Such copolymer is preferably produced using a single-site catalyst.

(ii) Molecular Weight Distribution Mw/Mn

Mw/Mn is a measure of molecular weight distribution. The larger this value, the wider the molecular weight distribution. The Mw/Mn of the overall polyethylene composition for use herein is preferably from about 5 to about 100, for example from about 7 to about 50. When the Mw/Mn is less than 5, the percentage of a higher molecular weight component is too high to conduct melt extrusion easily. On the other hand, when the Mw/Mn is more than 100, the percentage of a lower molecular weight component is too high, resulting in decrease in the strength of the resulting microporous membrane. The Mw/Mn of polyethylene (homopolymer or an ethylene/α-olefin copolymer) can be properly controlled by a multi-stage polymerization. The multi-stage polymerization method is preferably a two-stage polymerization method comprising forming a high molecular weight polymer component in the first stage, and forming a low molecular weight polymer component in the second stage. In the polyethylene composition for use herein, the larger the Mw/Mn, the larger difference in Mw exists between higher molecular weight polyethylene and lower molecular weight polyethylene, and vice versa. The Mw/Mn of the polyethylene composition can be properly controlled by the molecular weights and mixing ratios of components.

(b) Polypropylene Resin

The polyolefin solution can optionally contain polypropylene resin. For example, the polypropylene resin for optional use herein can have a weight average molecular weight of from about $3\times10^5$ to about $1.5\times10^6$, for example from about $6\times10^5$ to about $1.5\times10^6$, a heat of fusion of 80 J/g or higher, for non-limiting example from about 80 to about 120 J/g, and a molecular weight distribution of from about 1 to about 100, for example from about 1.1 to about 50, and can be a propylene homopolymer or a copolymer of propylene and another, i.e. a fourth, olefin, though the homopolymer is preferable. Optionally, the polypropylene is isotactic polypropylene having a melting peak (second melt) of at least about 160° C. Optionally, the polypropylene has a Trouton's ratio of 15 or more when measured at a temperature of 230° C. and a strain rate of 25 sec$^{-1}$. Optionally, the polypropylene has an elongational viscosity of 50,000 Pa sec or more at a temperature of 230° C. and a strain rate of 25 sec$^{-1}$. When the polypropylene is a copolymer, the copolymer may be a random or block copolymer. The fourth olefin, which is an olefin other than propylene, includes α-olefins such as ethylene, butene-1, pentene-1, hexene-1,4-methylpentene-1, octene-1, vinyl acetate, methyl methacrylate, styrene, etc., and diolefins such as butadiene, 1,5-hexadiene, 1,7-octadiene, 1,9-decadiene, etc. The percentage of the fourth olefin in the propylene copolymer is preferably in a range that does not deteriorate the properties of the microporous membrane such as heat resistance, compression resistance, heat shrinkage resistance, etc., and is preferably less than about 10 mole %, e.g. from about 0 to less than about 10 mole %.

In an embodiment, the amount of polypropylene resin in the polyolefin composition is 55% or less by mass, or 40% or less by mass, or 25% or less by mass based on 100% of the mass of the polyolefin composition. In this embodiment, the percentage of polypropylene resin may be, for example, from about 5 to about 20% by mass, and for further example from about 7 to about 15% by mass of the polyolefin composition.

(2) Other Components

In addition to the above components, the polyolefin solution can contain (a) additional polyolefin and/or (b) heat-resistant polymer resins having melting points or glass transition temperatures (Tg) of about 170° C. or higher, in amounts not deteriorating the properties of the microporous membrane, for example 10% or less by mass based on the polyolefin composition. It is not necessary to add inorganic oxides such as silicon oxides to the polyolefin solution, and in an embodiment, the polyolefin solution does not contain added inorganic oxides. In a related embodiment, the polyolefin solution does not contain a significant amount of inorganic oxides such as silicon oxides. In this context, the phrase "does not contain a significant amount of inorganic oxides" means that the content of such oxides is less than 0.1 wt %, or less than 0.01 wt %, less than 0.001 wt %, or less than 100 ppmw, based on the weight of the polyolefin solution.

(a) Additional Polyolefins

The additional polyolefin can be at least one of (a) polybutene-1, polypentene-1, poly-4-methylpentene-1, polyhexene-1, polyoctene-1, polyvinyl acetate, polymethyl methacrylate, polystyrene and an ethylene/α-olefin copolymer, each of which may have an Mw of form $1\times10^4$ to $4\times10^6$, and (b) a polyethylene wax having an Mw of form $1\times10^3$ to $1\times10^4$. Polybutene-1, polypentene-1, poly-4-methylpentene-1, polyhexene-1, polyoctene-1, polyvinyl acetate, polymethyl methacrylate and polystyrene are not restricted to homopolymers, but may be copolymers containing still other α-olefins.

(b) Heat-Resistant Resins

The heat-resistant resins can be, for example, (a) amorphous resins having melting points of about 170° C. or higher, which may be partially crystalline, and (b) completely amorphous resins having Tg of about 170° C. or higher and mixtures thereof. The melting point and Tg are determined by differential scanning calorimetry (DSC) according to method JIS K7121. Specific examples of the heat-resistant resins include polyesters such as polybutylene terephthalate (melting point: about 160-230° C.), polyethylene terephthalate (melting point: about 250-270° C.), etc., fluororesins, polyamides (melting point: 215-265° C.), polyarylene sulfide, polyimides (Tg: 280° C. or higher), polyamide imides (Tg: 280° C.), polyether sulfone (Tg: 223° C.), polyetheretherketone (melting point: 334° C.), polycarbonates (melting point: 220-240° C.), cellulose acetate (melting point: 220° C.), cellulose triacetate (melting point: 300° C.), polysulfone (Tg: 190° C.), polyetherimide (melting point: 216° C.), etc.

(c) Content

The total amount of the additional polyolefin and the heat-resistant resin is preferably 20% or less, for example from about 0 to about 20%, by mass per 100% by mass of the polyolefin solution.

[2] Production Method for Microporous Membrane

The present invention relates to a method for producing the microporous membrane comprising the steps of (1) combining certain specific polyolefins (generally in the form of polyolefin resins) and at least one solvent or diluent to form a polyolefin solution, (2) extruding the polyolefin solution through a die to form an extrudate, (3) cooling the extrudate to form a cooled extrudate, (4) stretching the cooled extrudate at a certain specific temperature to form a stretched sheet, (5) removing the solvent or diluent from the stretched sheet to form a solvent/diluent-removed membrane, (6) stretching the solvent/diluent-removed membrane at a certain specific temperature and to a certain specific magnification to form a stretched membrane, and (7) heat-setting the stretched membrane to form the microporous membrane. A heat-setting treatment step (4i), a heat roll treatment step (4ii), and/or a hot solvent treatment step (4iii) may be conducted between the steps (4) and (5), if desired. A heat-setting treatment step (5i) may be conducted between the steps (5) and (6). A step (5ii) of cross-linking with ionizing radiations following step (5i) prior to step (6), and a hydrophilizing treatment step (7i) and a surface-coating treatment step (7ii) may be conducted after the step (7), if desired.

(1) Preparation of the Polyolefin Solution

The polyolefin resins may be combined with at least one solvent or diluent to prepare a polyolefin solution. Alternatively, the polyolefin resins may be combined, for example, by melt-blending, dry mixing, etc., to make a polyolefin composition, which is then combined with at least one solvent or diluent to prepare a polyolefin solution. The polyolefin solution may contain, if desired, various additives such as antioxidants, fine silicate powder (pore-forming material), etc., in amounts which do not deteriorate the properties of the present invention.

To enable stretching at relatively higher magnifications, the diluent or solvent, e.g. a membrane-forming solvent, is preferably liquid at room temperature. The liquid solvents can be, for example, aliphatic, alicyclic or aromatic hydrocarbons such as nonane, decane, decalin, p-xylene, undecane, dodecane, liquid paraffin, mineral oil distillates having boiling points comparable to those of the above hydrocarbons, and phthalates liquid at room temperature such as dibutyl phthalate, dioctyl phthalate, etc. To most effectively obtain an extrudate having a stable solvent content, it is preferable to use a non-volatile liquid solvent such as liquid paraffin. In an embodiment, one or more solid solvents which are miscible with the polyolefin composition during, for example, melt-blending, but solid at room temperature may be added to the liquid solvent. Such solid solvents are preferably stearyl alcohol, ceryl alcohol, paraffin waxes, etc. In another embodiment, solid solvent can be used without liquid solvent. However, when only the solid solvent is used, uneven stretching, etc., can occur.

The viscosity of the liquid solvent is preferably from about 30 to about 500 cSt, more preferably from about 30 to about 200 cSt, when measured at a temperature of 25° C. When the viscosity at 25° C. is less than 30 cSt, the polyolefin solution may foam, resulting in difficulty in blending. On the other hand, when the viscosity is more than 500 cSt, the removal of the liquid solvent can be difficult.

Though not particularly critical, the uniform melt-blending of the polyolefin solution is preferably conducted in a double-screw extruder to prepare a high concentration polyolefin solution. The diluent or solvent, e.g. a membrane-forming solvent, may be added before starting melt-blending, or supplied to the double-screw extruder in an intermediate portion during blending, though the latter is preferable.

The melt-blending temperature of the polyolefin solution is preferably in a range of the melting point ("Tm") of the polyethylene resin +10° C. to Tm+120° C. The melting point can be measured by differential scanning calorimetry (DSC) according to JIS K7121. In an embodiment, the melt-blending temperature is from about 140 to about 250° C., more preferably from about 170 to about 240° C., particularly where the polyethylene resin has a melting point of about 130 to about 140° C.

To obtain a good hybrid structure, the concentration of the polyolefin composition in the polyolefin solution is preferably from about 25 to about 50% by mass, more preferably from about 25 to about 45% by mass, based on the mass of the polyolefin solution.

The ratio L/D of the screw length L to the screw diameter D in the double-screw extruder is preferably in a range of from about 20 to about 100, more preferably in a range of from about 35 to about 70. When L/D is less than 20, melt-blending can be inefficient. When L/D is more than 100, the residence time of the polyolefin solution in the double-screw extruder can be too long. In this case, the membrane's molecular weight deteriorates as a result of excessive shearing and heating, which is undesirable. The cylinder of the double-screw extruder preferably has an inner diameter of from about 40 to about 100 mm.

In the double-screw extruder, the ratio Q/Ns of the amount Q (kg/h) of the polyolefin solution charged to the number of revolution Ns (rpm) of a screw is preferably from about 0.1 to about 0.55 kg/h/rpm. When Q/Ns is less than 0.1 kg/h/rpm, the polyolefin can be damaged by shearing, resulting in decrease in strength and meltdown temperature. When Q/Ns is more than 0.55 kg/h/rpm, uniform blending cannot be achieved. Q/Ns is more preferably from about 0.2 to about 0.5 kg/h/rpm. The number of revolutions Ns of the screw is preferably 180 rpm or more. Though not particularly critical, the upper limit of the number of revolutions Ns of the screw is preferably about 500 rpm.

(2) Extrusion

The components of the polyolefin solution can be melt-blended in the extruder and extruded from a die. In another embodiment, the components of the polyolefin solution can be extruded and then pelletized. In this embodiment, the pellets can be melt-blended and extruded in a second extrusion to make a gel-like molding or sheet. In either embodiment, the die can be a sheet-forming die having a rectangular orifice, a double-cylindrical, hollow die, an inflation die, etc. Although the die gap is not critical, in the case of a sheet-forming die, the die gap is preferably from about 0.1 to about 5 mm. The extrusion temperature is preferably from about 140 to about 250° C., and the extruding speed is preferably from about 0.2 to about 15 m/minute.

(3) Formation of Cooled Extrudate

The extrudate from the die is cooled to form a cooled extrudate, generally in the gel-like molding or sheet. Preferably, the extrudate has a high polyolefin content. Cooling is preferably conducted at least to a gelation temperature at a cooling rate of about 50° C./minute or more. Cooling is preferably conducted to about 25° C. or lower. Such cooling sets the micro-phase of the polyolefin separated by the membrane-forming solvent. Generally, the slower cooling rate provides the gel-like sheet with larger pseudo-cell units, resulting in a coarser higher-order structure. On the other hand, a higher cooling rate results in denser cell units. A cooling rate of less than 50° C./minute can lead to increased crystallinity, making it more difficult to provide the gel-like sheet with suitable stretchability. Usable cooling methods include bringing the extrudate into contact with a cooling medium such as cooling air, cooling water, etc.; bringing the extrudate into contact with cooling rollers; etc.

By high polyolefin content, it is meant that the cooled extrudate comprises at least about 25%, for example from about 25 to about 50%, polyolefin derived from the resins of the polyolefin composition, based on the mass of the cooled extrudate. It is believed that a polyolefin content of less than about 25% of the cooled extrudate makes it more difficult to form a hybrid microporous membrane structure having both small and large pores. A polyolefin content of more than about 50% leads to higher viscosity which makes it more difficult to form the desired hybrid structure. The cooled extrudate preferably has a polyolefin content at least as high as that of the polyolefin solution.

(4) Stretching the Cooled Extrudate

The cooled extrudate, generally in the form of a high polyolefin content gel-like molding or sheet, is then stretched in at least one direction. While not wishing to be bound by any theory or model, it is believed that the gel-like sheet can be uniformly stretched because the sheet contains the membrane-forming solvent. The gel-like sheet is preferably stretched to a predetermined magnification after heating by, for example, a tenter method, a roll method, an inflation method or a combination thereof. The stretching may be conducted monoaxially or biaxially, though the biaxial stretching is preferable. In the case of biaxial stretching, any of simultaneous biaxial stretching, sequential stretching or multi-stage stretching (for instance, a combination of the simultaneous biaxial stretching and the sequential stretching) may be used, though the simultaneous biaxial stretching is preferable. The amount of stretch in either direction need not be the same.

The stretching magnification of this first stretching step can be, for example, 2 fold or more, preferably 3 to 30 fold in the case of monoaxial stretching. In the case of biaxial stretching, the stretching magnification can be, for example, 3 fold or more in any direction, namely 9 fold or more, preferably 16 fold or more, more preferably 25 fold or more, e.g. 49 fold or more, in area magnification. An example for this first stretching step would include stretching from about 9 fold to about 400 fold. A further example would be stretching from about 16 to about 49 fold. Again, the amount of stretch in either direction need not be the same. With the area magnification of 9 fold or more, the pin puncture strength of the microporous membrane is improved. When the area magnification is more than 400 fold, stretching apparatuses, stretching operations, etc., involve large-sized stretching apparatuses, which can be difficult to operate.

In an embodiment, a relatively high stretching temperature is used in this first stretching step, preferably from about the crystal dispersion temperature ("Tcd") of the combined polyethylene content of the cooled extrudate to about Tcd+30° C., e.g. in a range of Tcd of the combined polyethylene content to Tcd+25° C., more specifically in a range of Tcd+10° C. to Tcd+25° C., most specifically in a range of Tcd+15° C. to Tcd+25° C. When the stretching temperature is lower than Tcd, it is believed that the combined polyethylene content is so insufficiently softened that the gel-like sheet is easily broken by stretching, failing to achieve high-magnification stretching.

The crystal dispersion temperature is determined by measuring the temperature characteristics of dynamic viscoelasticity according to ASTM D 4065. Because the combined polyethylene content herein has a crystal dispersion temperature of about 90 to 100° C., the stretching temperature is from about 90 to 125° C.; preferably form about 100 to 125° C., more preferably from 105 to 125° C.

The above stretching causes cleavage between polyolefin, e.g. polyethylene, lamellas, making the polyolefin phases finer and forming large numbers of fibrils. The fibrils form a three-dimensional network structure. The stretching is believed to improve the mechanical strength of the microporous membrane and expands its pores, making the microporous membrane suitable for use as a battery separator.

Depending on the desired properties, stretching may be conducted with a temperature distribution in a thickness direction, to provide the microporous membrane with further improved mechanical strength. The detailed description of this method is given by Japanese Patent 3347854.

(5) Removal of the Solvent or Diluent

For the purpose of removing (washing away, displacing or dissolving) at least a portion of the solvent or diluent, a second solvent, also called a "washing solvent," is used. Because the polyolefin composition phase is phase-separated from a membrane-forming solvent phase, the removal of the solvent or diluent provides a microporous membrane. The removal of the solvent or diluent can be conducted by using one or more suitable washing solvents, i.e., one capable of displacing the liquid solvent from the membrane. Examples of the washing solvents include volatile solvents, e.g., saturated hydrocarbons such as pentane, hexane, heptane, etc., chlorinated hydrocarbons such as methylene chloride, carbon tetrachloride, etc., ethers such as diethyl ether, dioxane, etc., ketones such as methyl ethyl ketone, etc., linear fluorocarbons such as trifluoroethane, $C_6F_{14}$, etc., cyclic hydrofluorocarbons such as $C_5H_3F_7$, etc., hydrofluoroethers such as $C_4F_9OCH_3$, $C_4F_9OC_2H_5$, etc., perfluoroethers such as $C_4F_9OCF_3$, $C_4F_9OC_2F_5$, etc., and mixtures thereof.

The washing of the stretched membrane can be conducted by immersion in the washing solvent and/or showering with the washing solvent. The washing solvent used is preferably from about 300 to about 30,000 parts by mass per 100 parts by mass of the stretched membrane. The washing temperature is usually from about 15 to about 30° C., and if desired, heating may be conducted during washing. The heating temperature during washing is preferably about 80° C. or lower. Washing is preferably conducted until the amount of the remaining liquid solvent becomes less than 1% by mass of the amount of liquid solvent that was present in polyolefin solution prior to extrusion.

The microporous membrane deprived of the diluent or solvent, e.g. a membrane-forming solvent, can be dried by a heat-drying method, a wind-drying (e.g., air drying using moving air) method, etc., to remove remaining volatile components from the membrane, e.g. washing solvent. Any drying method capable of removing a significant amount of the washing solvent can be used. Preferably, substantially all of the washing solvent is removed during drying. The drying temperature is preferably equal to or lower than Tcd, more preferably 5° C. or more lower than Tcd. Drying is conducted until the remaining washing solvent becomes preferably 5% or less by mass, more preferably 3% or less by mass, per 100% by mass (on a dry basis) of the microporous membrane. Insufficient drying undesirably can lead to decrease in the porosity of the microporous membrane by the subsequent heat treatment, resulting in poor permeability.

(6) Stretching the Dried Membrane

The dried membrane is stretched in a second stretching step (re-stretched) at least monoaxially at high magnification. The re-stretching of the membrane can be conducted, for example, while heating, by a tenter method, etc., as in the first stretching step. The re-stretching may be monoaxial or biaxial. In the case of biaxial stretching, any one of simultaneous biaxial stretching or sequential stretching may be used, though the simultaneous biaxial stretching is preferable. Because the re-stretching is usually conducted on the membrane in a long sheet form, which is obtained from the stretched gel-like sheet, the directions of MD and TD (where MD means "machine direction", i.e., the direction of membrane travel during processing, and TD means "transverse direction", i.e., a direction orthogonal to both the MD and the horizontal surface of the membrane) in the re-stretching is usually the same as those in the stretching of the cooled extrudate. In the present invention, however, the re-stretching is actually somewhat greater than that used in the stretching of the cooled extrudate. Stretching magnification in this step is from about 1.1 to about 1.8 fold in at least one direction, for example from about 1.2 to about 1.6 fold. Stretching need not be the same magnification in each direction. If stretching in step (4) of the present method is lower in the range of from about 9 to about 400, then stretching in step (6) of the present method should be higher in the range of from about 1.1 to about 1.8. Likewise, if stretching in step (4) of the present method is higher in the range of from about 9 to about 400, then stretching in step (6) of the present method should be lower in the range of from about 1.1 to about 1.8.

The second stretching or re-stretching is conducted at a second temperature preferably equal to Tm or lower, more preferably in a range of Tcd to Tm. When the second stretching temperature is higher than Tm, it is believed that the melt viscosity is generally too low to conduct good stretching, resulting in low permeability. When the second stretching temperature is lower than Tcd, it is believed that the polyolefin is insufficiently softened so that the membrane might be broken by stretching, i.e., a failure to achieve uniform stretching. In an embodiment, the second stretching temperature is usually from about 90 to about 135° C., preferably from about 95 to about 130° C.

The monoaxial stretching magnification of the membrane in this step, as mentioned above, is preferably from about 1.1 to about 1.8 fold. A magnification of 1.1 to 1.8 fold generally provides the membrane of the present invention with a hybrid structure having a large average pore size. In the case of monoaxial stretching, the magnification can be form 1.1 to 1.8 fold in a longitudinal or transverse direction. In the case of biaxial stretching, the membrane may be stretched at the same or different magnifications in each stretching direction, though preferably the same, as long as the stretching magnifications in both directions are within 1.1 to 1.8 fold.

When the second stretching magnification of the membrane is less than 1.1 fold, it is believed that the hybrid structure is not formed, resulting in poor permeability, electrolytic solution absorption and compression resistance in the membrane. When the second stretching magnification is more than 1.8 fold, the fibrils formed are too fine, and it is believed that the heat shrinkage resistance and the electrolytic solution absorption characteristics of the membrane are reduced. This second stretching magnification is more preferably from 1.2 to 1.6 fold.

The stretching rate is preferably 3%/second or more in a stretching direction. In the case of monoaxial stretching, stretching rate is 3%/second or more in a longitudinal or transverse direction. In the case of biaxial stretching, stretching rate is 3%/second or more in both longitudinal and transverse directions. A stretching rate of less than 3%/second decreases the membrane's permeability, and provides the membrane with large unevenness in properties (particularly, air permeability) in a width direction when stretched in a transverse direction. The stretching rate is preferably 5%/second or more, more preferably 10%/second or more. Though not particularly critical, the upper limit of the stretching rate is preferably 50%/second to prevent rupture of the membrane.

(7) Heat Treatment

The re-stretched membrane is thermally treated (heat-set) to stabilize crystals and make uniform lamellas in the membrane. The heat-setting is preferably conducted by a tenter method or a roll method. The heat-setting temperature can be, e.g., in a range of the second stretching temperature of the membrane ±5° C., or in a range of the second stretching temperature of the membrane ±3° C. It is believed that too low a heat-setting temperature deteriorates the membrane's pin puncture strength, tensile rupture strength, tensile rupture elongation and heat shrinkage resistance, while too high a heat-setting temperature deteriorates membrane permeability.

An annealing treatment can be conducted after the heat-setting step. The annealing is a heat treatment with no load applied to the microporous membrane, and may be conducted by using, e.g., a heating chamber with a belt conveyer or an air-floating-type heating chamber. The annealing may also be conducted continuously after the heat-setting with the tenter slackened. The annealing temperature is preferably Tm or lower, more preferably in a range from about 60° C. to about Tm−5° C. Annealing is believed to provide the microporous membrane with high permeability and strength. Optionally, the membrane is annealed without prior heat-setting. In an embodiment, the heat-setting of step (7) is optional.

(8) Heat-Setting Treatment of Stretched Sheet

The stretched sheet between the steps (4) and (5) may be heat-set, provided this heat setting does not deteriorate the properties of the microporous membrane. The heat-setting method may be conducted the same way as described above for step (7).

(9) Heat Roller Treatment

At least one surface of the stretched sheet from step (4) may be brought into contact with one or more heat rollers following any of steps (4) to (7). The roller temperature is preferably in a range of from Tcd+10° C. to Tm. The contact time of the heat roll with the stretched sheet is preferably from about 0.5 second to about 1 minute. The heat roll may have a flat or rough surface. The heat roll may have a suction functionality to remove the solvent. Though not particularly critical, one example of a roller-heating system may comprise holding heated oil in contact with a roller surface.

(10) Hot Solvent Treatment

The stretched sheet may be contacted with a hot solvent between steps (4) and (5). A hot solvent treatment turns fibrils formed by stretching to a leaf vein form with relatively thick fiber trunks, providing the microporous membrane with large pore size and suitable strength and permeability. The term "leaf vein form" means that the fibrils have thick fiber trunks, and thin fibers extending in a complicated network structure from the trunks. The details of the hot solvent treatment method are described in WO 2000/20493.

(11) Heat-Setting of Membrane Containing Washing Solvent

The microporous membrane containing a washing solvent between the steps (5) and (6) may be heat-set to a degree that does not deteriorate the properties of the microporous membrane. The heat-setting method may be the same as described above in step (7).

(12) Cross-Linking

The heat-set microporous membrane may be cross-linked by ionizing radiation rays such as α-rays, β-rays, γ-rays, electron beams, etc. In the case of irradiating electron beams, the amount of electron beams is preferably from about 0.1 to about 100 Mrad, and the accelerating voltage is preferably form about 100 to about 300 kV. The cross-linking treatment elevates the meltdown temperature of the microporous membrane.

(13) Hydrophilizing Treatment

The heat-set microporous membrane may be subjected to a hydrophilizing treatment (a treatment that makes the membrane more hydrophilic). The hydrophilizing treatment may be a monomer-grafting treatment, a surfactant treatment, a corona-discharging treatment, etc. The monomer-grafting treatment is preferably conducted after the cross-linking treatment.

In the case of surfactant treatment hydrophilizing the heat-set microporous membrane, any of nonionic surfactants, cationic surfactants, anionic surfactants and amphoteric surfactants may be used, and the nonionic surfactants are preferred. The microporous membrane can be dipped in a solution of the surfactant in water or a lower alcohol such as methanol, ethanol, isopropyl alcohol, etc., or coated with the solution by a doctor blade method.

(14) Surface-Coating Treatment

While not required, the heat-set microporous membrane resulting from step (7) can be coated with porous polypropylene, porous fluororesins such as polyvinylidene fluoride and polytetrafluoroethylene, porous polyimides, porous polyphenylene sulfide, etc., to improve meltdown properties when the membrane is used as a battery separator. The polypropylene used for the coating preferably has Mw of form about 5,000 to about 500,000, and a solubility of about 0.5 grams or more in 100 grams of toluene at 25° C. Such polypropylene more preferably has a racemic diade fraction of from about 0.12 to about 0.88, the racemic diade being a structural unit in which two adjacent monomer units are mirror-image isomers to each other. The surface-coating layer may be applied, for instance, by applying a solution of the above coating resin in a good solvent to the microporous membrane, removing part of the solvent to increase a resin concentration, thereby forming a structure in which a resin phase and a solvent phase are separated, and removing the remainder of the solvent. Examples of good solvents for this purpose include aromatic compounds, such as toluene or xylene.

[1] Structure, Properties, and Composition of Microporous Polyolefin Membrane (1) Structure The microporous membrane produced by the above-described method has a relatively wide pore size distribution when plotted as a differential pore volume curve. Pore size distribution can be measured, e.g., by conventional methods such as mercury porosimetry.

When mercury porosimetry is used to measure the distribution of pore sizes and pore volume in the membrane, it is conventional to measure pore diameter, pore volume, and the specific surface area of the membrane. The measurements can be used to determine a differential pore volume expressed as $$\frac{dVp}{d\mathrm{Log}(r)}$$

where Vp is the pore volume, and r is the pore radius, assuming cylindrical pores. The differential pore volume when plotted on the y axis with pore diameter on the x axis is conventionally referred to as the "pore size distribution." For membranes exhibiting a hybrid structure, at least about 25%, or at least about 30%, or at least about 40%, or at least about 50%, or at least about 60%, of the differential pore volume is associated with pores that are about 100 nanometers in size (diameter) or larger. In other words, for the curve of $$\frac{dVp}{d\mathrm{Log}(r)}$$

vs. pore diameter, the fraction of the area under the curve from a pore diameter of about 100 nanometers to about 1,000 nanometers is at least about 25%, or at least about 30%, or at least about 40%, or at least about 50%, or at least about 60% of the total area under that curve for pore sizes (or diameters assuming cylindrical pores) of from about 10 nanometers to about 1,000 nanometers. In an embodiment, the area under the curve for pore diameters of from about 100 nanometers to about 1,000 nanometers is in the range of about 25% to about 60%, or about 30% to about 55%, or about 35% to about 50% of the total area under the curve for pore diameters of from about 10 nanometers to about 1,000 nanometers.

Though not critical, dense domains (relatively small pores) and coarse domains (relatively large pores) are irregularly entangled to form a hybrid structure in any cross sections of the microporous polyolefin membrane viewed in longitudinal and transverse directions. The hybrid structure can be observed by a transmission electron microscope (TEM), etc.

Because the microporous membrane of the present invention has relatively large internal space and openings due to coarse domains, it has suitable permeability and electrolytic solution absorption, with little air permeability variation when compressed. This microporous membrane also has relatively small internal space and openings which influence safety properties of the membrane when used as a battery separator, such as shutdown temperature and shutdown speed. Accordingly, lithium ion batteries such as lithium ion secondary batteries comprising separators formed by such microporous membrane have suitable productivity and cyclability while retaining their high safety performance.

The mercury intrusion porosimetry method used to determine the microporous membrane structure involves use of a Pore Sizer 9320 (Micromeritics Company, Ltd.), a pressure range of from 3.6 kPa to 207 MPa, and a cell volume of 15 cm$^3$. For the measurements, a contact angle of mercury of 141.3 and a surface tension of mercury of 484 dynes/cm was employed. The parameters obtained by this included pore volume, surface area ratio, peak top of pore size, average pore size and porosity. References teaching this method include Raymond P. Mayer and Robert A. Stowe, J. Phys. Chem. 70,12(1966); L. C. Drake, Ind. Eng. Chem., 41,780(1949); H. L. Ritter and L. C. Drake, Ind. Eng. Chem. Anal., 17,782 (1945) and E. W. Washburn, Proc. Nat. Acad. Sci., 7,115 (1921).

The mercury intrusion porosimetry method can be briefly summarized as follows. Pressurized mercury is applied to a planar surface of the microporous membrane at a pressure P. This pressure does work W1 on the mercury, which causes the mercury to intrude into the pores of the microporous membrane until equilibrium is reached. In equilibrium, the force F1 on the surface of the mercury applied by pressure P is balanced by a Force F2 equal in magnitude to F1 but acting in the opposite direction. See FIG. 4. According to the conventional Washburn model, the amount of work needed to move the surface of the mercury in to the pore $W1 = 2\pi r \cdot L\gamma \cos\theta$ is balanced by the work done by the opposing force, which can be expressed as $W2 = P\pi r^2 L$. In these equations, L is the depth and r is the radius of the pores, assuming the pores are cylindrical. The contact angle of the mercury is expressed as $\theta$. The surface tension of mercury is expressed as y, which is generally recognized as $0.48\ Nm^{-1}$. Consequently, according to the Washburn model, pore radius r can be expressed as a function of the pressure P according to the equation $$r = \frac{2L\gamma\cos\theta}{P}.$$

The measurement of differential pore volume can then proceed as follows. First, the volume V of mercury intruded into the pores is measure as a function of pressure P. The measured value of P is used to calculate pore radius r, as described above. P is increased incrementally, and the volume of mercury is determined at each value of P. In this way, a table can be constructed showing the pore volume associated with pores of a particular r, tabulated over the range of r as determined by the range of P selected for the measurement. The values of r in the table can be conveniently converted to Log(r). Pore volume Vp is generally expressed as $cm^3$ per gram of the microporous membrane. Differential pore volume expressed as $$\frac{dVp}{d\text{Log}(r)}$$

can be calculated from the tabulated values of Vp and r, where dVp is approximated by the difference between adjacent values of Vp in the table, and where dLog(r) is approximated by the difference between adjacent values of Log(r) in the table. FIG. 5 is a representative of a Vp (pore volume) curve for an MPF having a hybrid structure (Example 7).

Because the microporous polyolefin membrane has relatively large internal space and openings due to coarse domains, it has suitable permeability and electrolytic solution absorption, with little air permeability variation when compressed. Accordingly, lithium ion batteries such as lithium ion secondary batteries comprising separators formed by such microporous polyolefin membrane have suitable productivity and cyclability.

In an embodiment, the microporous polyolefin membrane is a single-layer membrane. In another embodiment, microporous polyolefin membrane is a multi-layer membrane. For example, in one embodiment the multi-layer, microporous polyolefin membrane comprises two layers where the first layer (e.g., the upper layer) comprises a first microporous layer material, and the second layer (e.g., the bottom layer) comprises an independently-selected second microporous layer material. At least one of the first or second microporous layer materials is characterized by a hybrid structure, i.e., the microporous layer material is characterized by a differential pore volume curve having an area under the curve over the range of pore diameters of from about 100 nm to about 1,000 nm that is about 25% or more of a total area under the curve over the range of pore diameters of from about 10 nm to about 1,000 nm. In an alternative embodiment, the microporous membrane is a multi-layer, microporous membrane which comprises three or more layers, wherein the outer layers (also called the "surface" or "skin" layers) comprise the first microporous layer material and at least one intermediate (or interior) layer situated comprises an independently selected second microporous layer material. The interior layer(s) of the multi-layer, microporous polyolefin membrane are located between the surface layers, and optionally at least one interior layer is in planar contact with at least one surface layer. As is the case in the two-layer membrane, at least one layer of the multi-layer microporous membrane is characterized by a hybrid structure. When the multi-layer, microporous membrane has three or more layers, the multi-layer, microporous membrane has at least one layer comprising the first microporous layer material and at least one layer comprising an independently selected second microporous layer material. As will be appreciated by those skilled in the art, such multilayer microporous membranes can be made by processes such as lamination, co-extrusion, etc. The method described above in section [2] is suitable for making extrudates or microporous membranes which can be laminated to form the multi-layer microporous membranes. Alternatively, the method of section [2] can be used with a co extrusion die in step (2) of the method to make a multi-layer extrudate which is then processed in accordance with steps 3 through 7 of the method to make the multi-layer membrane. The optional steps described in that section can also be used, if desired. As discussed, at least one layer of the multi-layer microporous membrane is characterized by a hybrid structure. The polyolefin solution used to produce the hybrid-structure layer or layers is as described in section [2] above. The thickness of each layer of the multilayer membrane is independently selected. The thickness of a layer can be the same as at least one other layer, but this is not required.

(2) Properties

The microporous membranes of the invention generally have a shutdown temperature in the range of from about 130° C. to about 140° C., and a meltdown temperature in the range of about 145° C. to 200° C. In an embodiment where the microporous membrane contains polyethylene and polypropylene, the meltdown temperature is generally in the range of about 160° C. to about 200° C.

In preferred embodiments, the microporous polyolefin membranes have at least one of the following properties. Please add reasonable shut down and melt down temperature ranges.

(a) Air Permeability of 20 to 400 Seconds/100 $cm^3$ (Converted to the Value at 20-μm Thickness)

When the membrane's air permeability measured according to JIS P8117 is from 20 to 400 seconds/100 $cm^3$, batteries with separators formed by the microporous membrane have suitably large capacity and good cyclability. When the air permeability is less than 20 seconds/100 $cm^3$, shutdown does not sufficiently occur because pores are so large that they cannot fully close when the temperatures inside the batteries are elevated at 140° C. or more. Air permeability $P_1$ measured on a microporous membrane having a thickness $T_1$ according to JIS P8117 is converted to air permeability $P_2$ at a thickness of 20 μm by the equation of $P_2 = (P_1 \times 20)/T_1$.

(b) Porosity of 25-80%

When the porosity is less than 25%, the microporous membrane is not believed to have good air permeability. When the porosity exceeds 80%, battery separators formed by the microporous membrane are believed to have insufficient strength, which can result in the short-circuiting of battery's electrodes.

(c) Pin Puncture Strength of 2,000 mN or More (Converted to the Value at 20-μm Thickness)

The membrane's pin puncture strength (converted to the value at membrane thickness of 20-μm) is represented by the maximum load measured when the microporous membrane is pricked with a needle of 1 mm in diameter with a spherical end surface (radius R of curvature: 0.5 mm) at a speed of 2 mm/second. When the pin puncture strength is less than 2,000 mN/20 μm, short-circuiting might occur in batteries with separators formed by the microporous membrane.

(d) Tensile Rupture Strength of 49,000 kPa or More

A tensile rupture strength of 49,000 kPa or more in both longitudinal and transverse directions (measured according to ASTM D-882), is characteristic of suitable durable microporous membranes, particularly when used as a battery separator. The tensile rupture strength is preferably 80,000 kPa or more.

(e) Tensile Rupture Elongation of 100% or More

A tensile rupture elongation of 100% or more in both longitudinal and transverse directions (measured according to ASTM D-882), is characteristic of suitably durable microporous membranes, particularly when used as a battery separator.

(f) Heat Shrinkage Ratio of 12% or Less

When the heat shrinkage ratio after exposed to 105° C. for 8 hours exceeds 12% in both longitudinal and transverse directions, heat generated in batteries with the microporous membrane separators can cause the shrinkage of the separators, making it more likely that short-circuiting occurs on the edges of the separators.

(g) Thickness Variation Ratio of 20% or Less after Heat Compression

The thickness variation ratio after heat compression at 90° C. under pressure of 2.2 MPa for 5 minutes is generally 20% or less, per 100% of the thickness before compression. Batteries comprising microporous membrane separators with a thickness variation ratio of 20% or less have suitably large capacity and good cyclability.

(h) Air Permeability of 700 sec or Less after Heat Compression

The microporous polyolefin membrane when heat-compressed under the above conditions generally has air permeability (Gurley value) of 700 sec/100 cm$^3$ or less. Batteries using such membranes have suitably large capacity and cyclability. The air permeability is preferably 650 sec/100 cm$^3$ or less.

(i) Surface Roughness of $3\times10^2$ nm or More

The surface roughness of the membrane measured by an atomic force microscope (AFM) in a dynamic force mode is generally $3\times10^2$ nm or more (measured as the maximum height difference). The membrane's surface roughness is preferably $3.5\times10^2$ nm or more. The measurement can be made using conventional equipment, e.g., model SPA500 available from SII Nano Technology Inc. The maximum height difference is defined as (the height of the highest point on the surface)−(that of the lowest point) over the region of membrane examined.

(j) Normalized Electrolytic Solution Absorption Speed

Using a dynamic-surface-tension-measuring apparatus (DCAT21 with high-precision electronic balance, available from Eko Instruments Co., ltd.), a microporous membrane sample was immersed in an electrolytic solution (electrolyte: 1 mol/L of LiPF$_6$, solvent: ethylene carbonate/dimethyl carbonate at a volume ratio of 3/7) kept at 18° C., to determine an electrolytic solution absorption speed by the formula of [weight increment (g) of microporous membrane/weight (g) of microporous membrane before absorption]. In this context, the "normalized" electrolytic solution absorption speed means the electrolytic solution absorption speed is expressed relative to the measured value of the electrolytic solution absorption rate in the microporous membrane of Comparative Example 1. When the measured electrolytic solution absorption speed for a microporous membrane having a hybrid structure is divided by the electrolytic solution absorption speed measured for the membrane of Comparative Example 1, then the quotient, i.e., the normalized electrolytic solution absorption speed, is greater than 1.

(3) Microporous Polyolefin Membrane Composition (1) Polyolefin

The microporous polyolefin membrane generally comprises the polyolefin used to form the polyolefin solution. A small amount of washing solvent and/or membrane-forming solvent can also be present, generally in amounts less than 1 wt % based on the weight of the microporous polyolefin membrane. A small amount of polyolefin molecular weight degradation might occur during processing, but this is acceptable. In an embodiment, molecular weight degradation during processing, if any, causes the value of Mw/Mn of the polyolefin in the membrane to differ from the Mw/Mn of the polyolefin solution by no more than about 50%, or no more than about 10%, or no more than about 1%, or no more than about 0.1%.

Accordingly, in an embodiment of the microporous membrane of the present invention comprises (a) a first polyethylene having a weight average molecular weight of from about $2.5\times10^5$ to about $5\times10^5$, and optionally polyolefins (b) and (c), where (b) is from about 0 to about 7% of a second polyethylene having a weight average molecular weight of from about $5\times10^5$ to about $1\times10^6$, and (c) is from about 0 to about 25% of a polypropylene having a weight average molecular weight that does not exceed about $1.5\times10^6$.

(a) Polyethylene (i) Composition

The first polyethylene can be, for example, a high density polyethylene having a weight average molecular weight of from about $2.5\times10^5$ to about $5\times10^5$ and a molecular weight distribution of from about 5 to about 100. A non-limiting example of the first polyethylene of the membrane is one that has a weight average molecular weight of from about $2.5\times10^5$ to about $4\times10^5$ and a molecular weight distribution of form about 7 to about 50. The first polyethylene of the membrane can be an ethylene homopolymer, or an ethylene/α-olefin copolymer, such as, for example, one containing a small amount, e.g. about 5 mole %, of a third α-olefin. The third α-olefin, which is not ethylene, is preferably propylene, butene-1, pentene-1, hexene-1,4-methylpentene-1, octene-1, vinyl acetate, methyl methacrylate, or styrene or combinations thereof.

The second polyethylene, for example an ultra-high molecular weight polyethylene, in the membrane has a weight average molecular weight that is greater than about $5\times10^5$. In an embodiment, the second polyethylene has a molecular weight distribution of from about 5 to about 100. The Mw of the second polyethylene can be, for example, in the range of about $1\times10^6$ to $15\times10^6$, or about $1\times10^6$ to $5\times10^6$, or about $1\times10^6$ to $3\times10^6$. A non-limiting example of the second polyethylene of the membrane is one that has a weight average molecular weight of from about $5 \times 10^5$ to about $8 \times 10^5$ and a molecular weight distribution of form about 5 to about 50. The second polyethylene of the membrane can be an ethylene homopolymer, or an ethylene/α-olefin copolymer, such as, for example, one containing a small amount, e.g. about 5 mole %, of a third α-olefin. The third α-olefin, which is not ethylene, is preferably propylene, butene-1, pentene-1, hexene-1,4-methylpentene-1, octene-1, vinyl acetate, methyl methacrylate, or styrene or combinations thereof.

(ii) Molecular Weight Distribution Mw/Mn of the Polyethylene in the Microporous Membrane Though not critical, the Mw/Mn of the polyethylene in the membrane is preferably from about 5 to about 100, for example from about 7 to about 50. When the Mw/Mn is less than 5, the percentage of a higher molecular weight component is too high to conduct melt extrusion easily. On the other hand, when the Mw/Mn is more than 100, the percentage of a lower molecular weight component is too high, resulting in decrease in the strength of the resulting microporous membrane. It is noted that some degradation of Mw from that of the starting resins may occur during manufacturing of the membrane by the present method, for example the Mw of the first polyethylene in the membrane product may be lower than that of the first polyethylene resin in the polyolefin composition portion of the polyolefin solution of method step (1).

(b) Polypropylene

The optional polypropylene in the membrane has a weight average molecular weight of from about $3 \times 10^5$ to about $1.5 \times 10^6$, for example from about $6 \times 10^5$ to about $1.5 \times 10^6$, a heat of fusion of 80 J/g or higher, for non-limiting example from about 80 to about 120 J/g, and a molecular weight distribution of from about 1 to about 100, for example from about 1.1 to about 50, and can be a propylene homopolymer or a copolymer of propylene and another, i.e. a fourth, olefin, though the homopolymer is preferable. The copolymer may be a random or block copolymer. The fourth olefin, which is an olefin other than propylene, includes α-olefins such as ethylene, butene-1, pentene-1, hexene-1,4-methylpentene-1, octene-1, vinyl acetate, methyl methacrylate, styrene, etc., and diolefins such as butadiene, 1,5-hexadiene, 1,7-octadiene, 1,9-decadiene, etc. The percentage of the fourth olefin in the propylene copolymer is preferably in a range not deteriorating the properties of the microporous polyolefin membrane such as heat resistance, compression resistance, heat shrinkage resistance, etc., and is preferably less than about 10 mole %, e.g. from about 0 to less than about 10 mole %. Again, it is noted that some degradation of Mw from that of the starting resins may occur during manufacturing of the membrane by the present method, for example the Mw of the polypropylene in the membrane product may be lower than that of the polypropylene resin in the polyolefin composition portion of the polyolefin solution of method step (1).

The heat of fusion is determined by differential scanning calorimetry (DSC). The DSC is conducted using a TA Instrument MDSC 2920 or Q1000 Tzero-DSC and data analyzed using standard analysis software. Typically, 3 to 10 mg of polymer is encapsulated in an aluminum pan and loaded into the instrument at room temperature. The sample is cooled to either −130° C. or −70° C. and heated to 210° C. at a heating rate of 10° C./minute to evaluate the glass transition and melting behavior for the sample. The sample is held at 210° C. for 5 minutes to destroy its thermal history. Crystallization behavior is evaluated by cooling the sample from the melt to sub-ambient temperature at a cooling rate of 10° C./minute. The sample is held at the low temperature for 10 minutes to fully equilibrate in the solid state and achieve a steady state. Second heating data is measured by heating this melt crystallized sample at 10° C./minute. Second heating data thus provides phase behavior for samples crystallized under controlled thermal history conditions. The endothermic melting transition (first and second melt) and exothermic crystallization transition are analyzed for onset of transition and peak temperature. The area under the curve is used to determine the heat of fusion ($\Delta H_f$).

In an embodiment, the amount of polypropylene in the membrane is 55% or less by mass, or 40% or less by mass, or 25% or less by mass based on the total mass of polyolefin in the membrane. Too large a percentage of polypropylene in the membrane can result in the microporous membrane having lower strength. The percentage of polypropylene is preferably 20% or less by mass, more preferably 15% or less by mass.

(2) Other Components

In addition to the above components, the membrane can contain an additional polyolefin and/or heat-resistant polymer having melting points or glass transition temperatures (Tg) of about 170° C. or higher.

(a) Additional Polyolefin

The additional polyolefin can be one or more of (a) polybutene-1, polypentene-1, poly-4-methylpentene-1, polyhexene-1, polyoctene-1, polyvinyl acetate, polymethyl methacrylate, polystyrene and an ethylene/α-olefin copolymer, each of which may have an Mw of from $1 \times 10^4$ to $4 \times 10^6$, and (b) a polyethylene wax having an Mw of form $1 \times 10^3$ to $1 \times 10^4$. Polybutene-1, polypentene-1, poly-4-methylpentene-1, polyhexene-1, polyoctene-1, polyvinyl acetate, polymethyl methacrylate and polystyrene are not restricted to homopolymers, but may be copolymers containing other α-olefins.

(b) Heat-Resistant Polymer

The heat-resistant polymers are preferably (i) amorphous polymers having melting points of about 170° C. or higher, which may be partially crystalline, and/or (ii) amorphous polymers having a Tg of about 170° C. or higher. The melting point and Tg are determined by differential scanning calorimetry (DSC) according to JIS K7121. Examples of the heat-resistant polymers include polyesters such as polybutylene terephthalate (melting point: about 160 to 230° C.), polyethylene terephthalate (melting point: about 250 to 270° C.), etc., fluororesins, polyamides (melting point: 215 to 265° C.), polyarylene sulfide, polyimides (Tg: 280° C. or higher), polyamide imides (Tg: 280° C.), polyether sulfone (Tg: 223° C.), polyetheretherketone (melting point: 334° C.), polycarbonates (melting point: 220 to 240° C.), cellulose acetate (melting point: 220° C.), cellulose triacetate (melting point: 300° C.), polysulfone (Tg: 190° C.), polyetherimide (melting point: 216° C.), etc.

(c) Content

The total amount of the additional polyolefin and the heat-resistant polymer in the membrane is preferably 20% or less by mass per 100% by mass of the membrane.

[4] Battery Separator

In an embodiment, the battery separator formed from any of the above microporous membranes has a thickness of 3 to 200 μm, or 5 to 50 μm, or 10 to 35 μm, though the most suitable thickness can be readily selected depending on the type of battery manufactured.

[5] Battery

Though not particularly critical, the microporous polyolefin membranes of the present invention may be used as separators for primary and secondary batteries, particularly such as lithium ion secondary batteries, lithium-polymer secondary batteries, nickel-hydrogen secondary batteries, nickel-cadmium secondary batteries, nickel-zinc secondary batteries, silver-zinc secondary batteries, particularly for lithium ion secondary batteries.

The lithium ion secondary battery comprises a cathode and an anode laminated via a separator, and the separator contains an electrolyte, usually in the form of an electrolytic solution ("electrolyte"). The electrode structure is not critical. Conventional structures are suitable. The electrode structure may be, for instance, a coin type in which a disc-shaped positive and anodes are opposing, a laminate type in which planar positive and anodes are alternately laminated, a toroidal type in which ribbon-shaped positive and anodes are wound, etc.

The cathode usually comprises a current collector, and a cathodic active material layer capable of absorbing and discharging lithium ions which is formed on the current collector. The cathodic active materials may be inorganic compounds such as transition metal oxides, composite oxides of lithium and transition metals (lithium composite oxides), transition metal sulfides, etc. The transition metals may be V, Mn, Fe, Co, Ni, etc. Preferred examples of the lithium composite oxides are lithium nickelate, lithium cobaltate, lithium manganate, laminar lithium composite oxides based on $\alpha$-NaFeO$_2$, etc. The anode comprises a current collector, and a negative-electrode active material layer formed on the current collector. The negative-electrode active materials may be carbonaceous materials such as natural graphite, artificial graphite, coke, carbon black, etc.

The electrolytic solution can be a solution obtained by dissolving a lithium salt in an organic solvent. The lithium salt may be LiClO$_4$, LiPF$_6$, LiAsF$_6$, LiSbF$_6$, LiBF$_4$, LiCF$_3$SO$_3$, LiN(CF$_3$SO$_2$)$_2$, LiC(CF$_3$SO$_2$)$_3$, Li$_2$B$_{10}$Cl$_{10}$, LiN(C$_2$F$_5$SO$_2$)$_2$, LiPF$_4$(CF$_3$)$_2$, LiPF$_3$(C$_2$F$_5$)$_3$, lower aliphatic carboxylates of lithium, LiAlCl$_4$, etc. These lithium salts may be used alone or in combination. The organic solvent may be an organic solvent having a high boiling point and high dielectric constant such as ethylene carbonate, propylene carbonate, ethylmethyl carbonate, $\gamma$-butyrolactone, etc.; and/or organic solvents having low boiling points and low viscosity such as tetrahydrofuran, 2-methyltetrahydrofuran, dimethoxyethane, dioxolane, dimethyl carbonate, dimethyl carbonate, etc. These organic solvents may be used alone or in combination. Because the organic solvents having high dielectric constants generally have high viscosity, while those having low viscosity generally have low dielectric constants, their mixtures are preferably used.

When the battery is assembled, the separator is impregnated with the electrolytic solution, so that the separator (microporous polyolefin membrane) is provided with ion permeability. The impregnation treatment is usually conducted by immersing the microporous membrane in the electrolytic solution at room temperature. When a cylindrical battery is assembled, for instance, a cathode sheet, a microporous membrane separator and an anode sheet are laminated in this order, and the resultant laminate is wound to a toroidal-type electrode assembly. The resultant electrode assembly is charged/formed into a battery can and then impregnated with the above electrolytic solution, and the battery lid acting as a cathode terminal provided with a safety valve is caulked to the battery can via a gasket to produce a battery.

The present invention will be explained in more detail referring to Examples below without intention of restricting the scope of the present invention.

EXAMPLE 1

Dry-blended were 100 parts by mass of (i) a polyethylene (PE) composition comprising 5% by mass of ultra-high-molecular-weight polyethylene (UHMWPE) having a weight-average molecular weight (Mw) of $1.5 \times 10^6$ and a molecular weight distribution (Mw/Mn) of 8, and (ii) 95% by mass of high-density polyethylene (HDPE) having Mw of $3.0 \times 10^5$ and Mw/Mn of 8.6, and 0.2 parts by mass of tetrakis[methylene-3-(3,5-ditertiary-butyl-4-hydroxyphenyl)-propionate] methane as an antioxidant. The polyethylene in the mixture had a melting point of 135° C., a crystal dispersion temperature of 100° C., and Mw/Mn of 10.0.

The Mw and Mw/Mn of each UHMWPE and HDPE were measured by a gel permeation chromatography (GPC) method under the following conditions.

Measurement apparatus: GPC-15° C. available from Waters Corporation,
Column: Shodex UT806M available from Showa Denko K.K.,
Column temperature: 135° C.,
Solvent (mobile phase): o-dichlorobenzene,
Solvent flow rate: 1.0 ml/minute,
Sample concentration: 0.1% by weight (dissolved at 135° C. for 1 hour),
Injected amount: 500 µl,
Detector: Differential Refractometer available from Waters Corp., and
Calibration curve: Produced from a calibration curve of a single-dispersion, standard polystyrene sample using a predetermined conversion constant.

40 parts by mass of the resultant mixture was charged into a strong-blending double-screw extruder having an inner diameter of 58 mm and L/D of 42, and 60 parts by mass of liquid paraffin [50 cst (40° C.)] was supplied to the double-screw extruder via a side feeder. Melt-blending was conducted at 210° C. and 200 rpm to prepare a polyethylene solution. This polyethylene solution was extruded from a T-die mounted to the double-screw extruder. The extrudate was cooled while passing through cooling rolls controlled at 40° C., to form a gel-like sheet.

Using a tenter-stretching machine, the gel-like sheet was simultaneously biaxially stretched at 118.5° C. to 5 fold in both longitudinal and transverse directions at a stretching rate of 1.0 meter per minute. The stretched gel-like sheet was fixed to an aluminum frame of 20 cm×20 cm, immersed in a bath of methylene chloride controlled at 25° C. to remove the liquid paraffin with vibration of 100 rpm for 3 minutes, and dried by an air flow at room temperature. The dried membrane was re-stretched by a batch-stretching machine to a magnification of 1.5 fold in a transverse direction at 129° C. The re-stretched membrane, which remained fixed to the batch-stretching machine, was heat-set at 129° C. for 30 seconds to produce a microporous polyethylene membrane.

EXAMPLE 2

A microporous polyethylene membrane was produced in the same manner as in Example 1, except that a polyethylene having a melting point of 135° C., a crystal dispersion temperature of 100° C. and Mw/Mn of 10.0, which comprised 2% by mass of UHMWPE having Mw of $2.0 \times 10^6$ and Mw/Mn of 8, and 98% by mass of HDPE having Mw of $2.5 \times 10^5$ and Mw/Mn of 8.9, was used. Also, the stretching temperature of the gel-like sheet was 119° C., the stretching magnification of the microporous membrane was 1.4 fold, and the stretching and heat-setting temperatures of the microporous membrane were both 129.5° C.

EXAMPLE 3

A microporous polyethylene membrane was produced in the same manner as in Example 1, except that polyethylene having a melting point of 135° C., a crystal dispersion temperature of 100° C., and Mw/Mn of 10.0, which comprised 2% by mass of UHMWPE having Mw of $2.0 \times 10^6$ and Mw/Mn of 8, and 98% by mass of HDPE having Mw of $3.0 \times 10^5$ and Mw/Mn of 8.6, was used. Also, the stretching magnification of the microporous membrane was 1.4 fold, and the stretching and heat-setting temperatures of the microporous membrane were both 126° C.

EXAMPLE 4

A microporous polyethylene membrane was produced in the same manner as in Example 1, except that a polyethylene having a melting point of 135° C., a crystal dispersion temperature of 100° C., and Mw/Mn of 10.5, which comprised 3% by mass of UHMWPE having Mw of $2.0 \times 10^6$ and Mw/Mn of 8, and 97% by mass of HDPE having Mw of $3.0 \times 10^5$ and Mw/Mn of 8.6, was used. Also, the stretching temperature of the gel-like sheet was 117° C., the stretched gel-like sheet was heat-set at 122° C. for 10 seconds, and the stretching and heat-setting temperatures of the microporous membrane were both 130° C.

EXAMPLE 5

A microporous polyethylene membrane was produced in the same manner as in Example 1, except that only HDPE having Mw of $3.0 \times 10^5$, Mw/Mn of 8.6, a melting point of 135° C. and a crystal dispersion temperature of 100° C. was used as a polyolefin, that the stretching temperature of the gel-like sheet was 118° C., and that the stretching magnification of the microporous membrane was 1.4 fold.

EXAMPLE 6

A microporous polyethylene membrane was produced in the same manner as in Example 1, except that the same polyethylene as in Example 4 was used. Also, the concentration of the polyethylene in the polyethylene solution was 30% by mass based on the mass of the polyethylene solution. Also, the stretching temperature of the gel-like sheet was 118° C., and the stretching magnification of the microporous membrane was 1.4 fold.

EXAMPLE 7

A microporous polyolefin membrane was produced in the same manner as in Example 1, except that a polyolefin composition was used comprising 3% by mass of UHMWPE having Mw of $2.0 \times 10^6$ and Mw/Mn of 8, 92% by mass of HDPE having Mw of $3.0 \times 10^5$ and Mw/Mn of 8.6, and 5% by mass of a propylene homopolymer (PP) having Mw of $5.3 \times 10^5$. The polyethylene had a melting point of 135° C., a crystal dispersion temperature of 100° C., and Mw/Mn of 10.5. The concentration of the polyolefin composition in the polyolefin solution was 35% by mass based on the mass of the polyolefin solution, the stretching temperature of the gel-like sheet was 116° C., the stretching magnification of the microporous membrane was 1.4 fold, and that the stretching and heat-setting temperatures of the microporous membrane were both 127° C. The Mw of PP was measured by a GPC method as above.

COMPARATIVE EXAMPLE 1

A microporous polyethylene membrane was produced in the same manner as in Example 1, except that polyethylene having a melting point of 135° C., a crystal dispersion temperature of 100° C., and Mw/Mn of 14.4, which comprised 20% by mass of UHMWPE having Mw of $2.0 \times 10^6$ and Mw/Mn of 8, and 80% by mass of HDPE having Mw of $3.5 \times 10^5$ and Mw/Mn of 8.6, was used. The concentration of the polyethylene in the polyethylene solution was 30% by mass, the stretching temperature of the gel-like sheet was 115° C., the microporous membrane containing a washing solvent was heat-set at 126.8° C. for 10 seconds, and the microporous membrane was not stretched and heat-set.

COMPARATIVE EXAMPLE 2

A microporous polyethylene membrane was produced in the same manner as in Example 1, except that polyethylene having a melting point of 135° C., a crystal dispersion temperature of 100° C., and Mw/Mn of 10.0, which comprised 2% by mass of UHMWPE having Mw of $2.0 \times 10^6$ and Mw/Mn of 8, and 98% by mass of HDPE having Mw of $3.5 \times 10^5$ and Mw/Mn of 8.6, was used. Also, the concentration of the polyethylene solution was 30% by mass, the stretching temperature of the gel-like sheet was 118° C., and the microporous membrane was heat-set at 128° C. for 10 seconds without being stretched.

COMPARATIVE EXAMPLE 3

A microporous polyethylene membrane was produced in the same manner as in Example 1, except that polyethylene having a melting point of 135° C., a crystal dispersion temperature of 100° C., and Mw/Mn of 10.5, which comprised 3% by mass of UHMWPE having Mw of $2.0 \times 10^6$ and Mw/Mn of 8, and 97% by mass of HDPE having Mw of $3.5 \times 10^5$ and Mw/Mn of 8.6, was used. Also, the concentration of the polyethylene solution was 30% by mass, the stretching temperature of the gel-like sheet was 115° C., microporous membrane was stretched to 2.0 folds at 130° C., and the heat-setting temperature was 126° C.

COMPARATIVE EXAMPLE 4

A microporous polyethylene membrane was produced in the same manner as in Example 1, except that the same polyethylene as in Comparative Example 1 was used. Also, the concentration of the polyethylene solution was 30% by mass, the stretching temperature of the gel-like sheet was 118° C., microporous membrane was stretched to 1.4 folds at 130° C., and the heat-setting temperature was 130° C.

COMPARATIVE EXAMPLE 5

A gel-like sheet was formed in the same manner as in Example 1, except for using polyethylene having a melting point of 135° C., a crystal dispersion temperature of 100° C., and Mw/Mn of 10.1, which comprised 2% by mass of UHMWPE having Mw of $2.0 \times 10^6$ and Mw/Mn of 8, and 98% by mass of HDPE having Mw of $2.0 \times 10^5$ and Mw/Mn of 8.9. When this gel-like sheet was stretched to 5 fold simultaneously in both longitudinal and transverse directions at 125° C., it was ruptured.

COMPARATIVE EXAMPLE 6

A microporous polyethylene membrane was produced in the same manner as in Example 1, except that the same polyethylene as in Comparative Example 5 was used. Also, the stretching temperature of the gel-like sheet was 11 g° C., the microporous membrane was stretched to 1.4 fold at 129.5° C., and the heat-setting temperature was 120° C.

COMPARATIVE EXAMPLE 7

A microporous polyethylene membrane was produced in the same manner as in Example 1, except that the same polyethylene as in Example 2 was used. Also, the stretching temperature of the gel-like sheet was 119° C., the microporous membrane was stretched to 1.4 fold at 115° C., and the heat-setting temperature was 134° C.

The properties of the microporous membranes obtained in Examples 1-7 and Comparative Examples 1-7 were measured by the following methods. The results are shown in Table 1. With respect to the microporous membranes of Examples 3 and 7, and Comparative Example 1, their pore size distribution curves obtained by mercury intrusion porosimetry are shown in FIGS. 2-4.

(1) Average Thickness (μm)

The thickness of each microporous membrane was measured by a contact thickness meter at 5-cm longitudinal intervals over the width of 30 cm, and averaged.

(2) Air permeability (sec/100 cm$^{3/20}$ μm)

Air permeability $P_1$ measured on each microporous membrane having a thickness $T_1$ according to JIS P8117 was converted to air permeability $P_2$ at a thickness of 20 μm by the equation of $P_2=(P_1\times20)/T_1$.

(3) Porosity (%)

Measured by a weight method.

(4) Pin Puncture Strength (mN/20 μm)

The maximum load was measured, when each microporous membrane having a thickness of $T_1$ was pricked with a needle of 1 mm in diameter with a spherical end surface (radius R of curvature: 0.5 mm) at a speed of 2 mm/second. The measured maximum load $L_1$ was converted to the maximum load $L_2$ at a thickness of 20 μm by the equation of $L_2=(L_1\times20)/T_1$, and used as pin puncture strength.

(5) Tensile Rupture Strength and Tensile Rupture Elongation

They were measured on a 10-mm-wide rectangular test piece according to ASTM D882.

(6) Heat Shrinkage Ratio (%)

The shrinkage ratios of each microporous membrane in both longitudinal and transverse directions were measured three times when exposed to 105° C. for 8 hours, and averaged to determine the heat shrinkage ratio.

(7) Thickness Variation Ratio after Heat Compression (%)

A microporous membrane sample was situated between a pair of highly flat plates, and heat-compressed by a press machine under a pressure of 2.2 MPa (22 kgf/cm$^2$) at 90° C. for 5 minutes, to determine an average thickness in the same manner as above. A thickness variation ratio was calculated by the formula of (average thickness after compression−average thickness before compression)/(average thickness before compression)×100.

(8) Air Permeability after Heat Compression (sec/100 cm$^{3/20}$ μm)

Each microporous membrane having a thickness of $T_1$ was heat-compressed under the above conditions, and measured with respect to air permeability $P_1$ according to JIS P8117. The measured air permeability $P_1$ was converted to air permeability $P_2$ at a thickness of 20 μm by the equation of $P_2=(P_1\times20)/T_1$.

(9) Electrolytic Solution Absorption Speed

Using a dynamic-surface-tension-measuring apparatus (DCAT21 with high-precision electronic balance, available from Eko Instruments Co., ltd.), a microporous membrane sample was immersed in an electrolytic solution (electrolyte: 1 mol/L of LiPF$_6$, solvent: ethylene carbonate/dimethyl carbonate at a volume ratio of 3/7) kept at 18° C., to determine an electrolytic solution absorption speed by the formula of [weight increment (g) of microporous membrane/weight (g) of microporous membrane before absorption]. The electrolytic solution absorption speed is expressed by a relative value, assuming that the electrolytic solution absorption rate in the microporous membrane of Comparative Example 1 is 1.

(10) Pore Size Distribution

Figure 1:
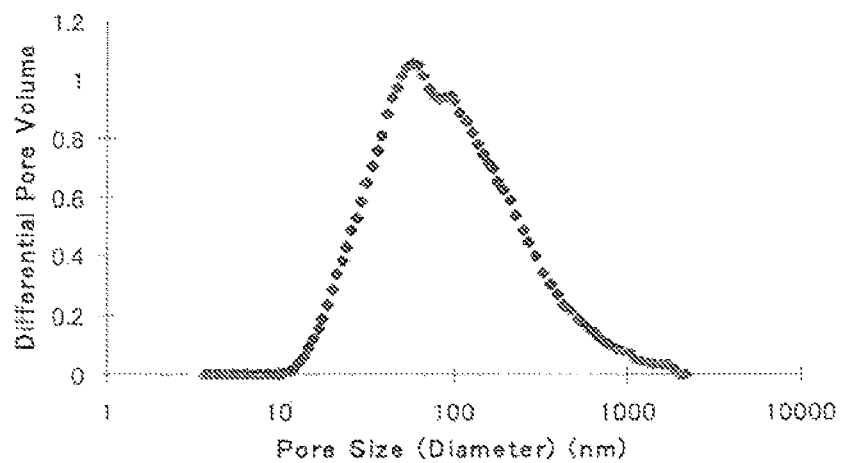
FIG. 1 shows the differential pore volume curve $$\frac{dVp}{d\text{Log}(r)}$$

The pore size distribution of the microporous membrane was determined by mercury intrusion porosimetry using the method described in section [3] above. The differential pore volume $$\frac{dVp}{d\mathrm{Log}(r)}$$

as a function of pore size is shown in FIG. 1 for the membrane of Example 3, in FIG. 2 for the membrane of Example 7, and FIG. 3 for the membrane of Comparative Example 2.

(11) Surface Roughness

The maximum height difference of a surface measured by AFM in a dynamic force mode (DFM) was used as surface roughness.

TABLE 1

| | No. | | | | | | |
|---|---|---|---|---|---|---|---|
| | Example 1 | Example 2 | Example 3 | Example 4 | Example 5 | Example 6 | Example 7 |
| Polyolefin | | | | | | | |
| UHMWPE Mw[(1)]/MWD[(2)]/% by mass | $1.5 \times 10^6$/8/5 | $2.0 \times 10^6$/8/2 | $2.0 \times 10^6$/8/2 | $2.0 \times 10^6$/8/3 | —/—/— | $2.0 \times 10^6$/8/3 | $2.0 \times 10^6$/8/3 |
| HDPE Mw/MWD/% by mass | $3.0 \times 10^5$/8.6/95 | $2.5 \times 10^5$/8.9/98 | $3.0 \times 10^5$/8.6/98 | $3.0 \times 10^5$/8.6/97 | $3.0 \times 10^5$/8.6/100 | $3.0 \times 10^5$/8.6/97 | $3.0 \times 10^5$/8.6/92 |
| PP Mw/% by mass | —/— | —/— | —/— | —/— | —/— | —/— | $5.3 \times 10^5$/5 |
| PE (Composition) Tm(° C.)[(3)]/Tcd(° C.)[(4)]/MWD | 135/100/10.0 | 135/100/10.0 | 135/100/10.0 | 135/100/10.5 | 135/100/8.6 | 135/100/10.5 | 135/100/10.5 |
| Production Conditions | | | | | | | |
| Polyolefin Concentration (% by mass) | 40 | 40 | 40 | 40 | 40 | 30 | 35 |
| Stretching of Gel-Like Sheet Temperature (° C.) | 118.5 | 119 | 118.5 | 117 | 118 | 118 | 116 |
| Magnification (MD × TD) | 5 × 5 | 5 × 5 | 5 × 5 | 5 × 5 | 5 × 5 | 5 × 5 | 5 × 5 |
| Heat-Setting of Stretched Gel-Like Sheet - Temp.(° C.)/Time (sec.) | —/— | —/— | —/— | 122/10 | —/— | —/— | —/— |
| Heat-Setting of Microporous Membrane Containing Washing Solvent Temperature (° C.)/Time (second) | —/— | —/— | —/— | —/— | —/— | —/— | —/— |
| Stretching of Microporous Membrane Temp. (° C.)/Direction/Magnification (folds) | 129/TD/1.5 | 129.5/TD/1.4 | 126/TD/1.4 | 130/TD/1.5 | 129/TD/1.4 | 129/TD/1.4 | 127/TD/1.4 |
| Heat-Setting of Microporous Membrane Temp.(° C.)/Time (sec.) | 129/30 | 129.5/30 | 126/30 | 130/30 | 129/30 | 129/30 | 127/30 |
| Properties of Microporous Membrane | | | | | | | |
| Average Thickness (µm) | 20.1 | 20.4 | 19.9 | 20.4 | 20.2 | 19.5 | 20.5 |
| Air Permeability (sec/100 cm³/20 µm) | 245 | 221 | 123 | 245 | 220 | 205 | 180 |
| Porosity (%) | 41.1 | 40.6 | 48.5 | 40.2 | 41 | 41.5 | 45.2 |
| Pin Puncture Strength (mN/20 µm) | 4,802 | 4,733.4 | 4,263 | 4,214 | 4,998 | 3,920 | 4,165 |
| Tensile Rupture Strength (kPa) MD | 112,700 | 113,860 | 98,000 | 117,110 | 118,090 | 106,820 | 113,680 |
| TD | 148,960 | 152,880 | 133,770 | 139,160 | 157,780 | 133,280 | 125,440 |
| Tensile Rupture Elongation (%) MD | 165 | 160 | 165 | 170 | 155 | 180 | 190 |
| TD | 125 | 110 | 120 | 115 | 100 | 140 | 175 |
| Heat Shrinkage Ratio (%) MD | 1.9 | 2.5 | 5.5 | 2.0 | 3.1 | 2.0 | 2.5 |
| TD | 2.5 | 2.8 | 5.6 | 2.6 | 3.6 | 2.6 | 2.2 |
| Higher-Order Structure First Peak (µm) | 0.05 | 0.04 | 0.06 | 0.05 | 0.07 | 0.05 | 0.06 |
| Second Peak (µm) | 0.1 | 0.1 | 0.1 | 0.1 | 0.11 | 0.1 | 0.1 |
| Third Peak (µm) | 0.7 | 0.7 | 0.7 | 0.7 | 0.7 | 0.7 | — |
| Fourth Peak (µm) | 1 | 1 | 1.1 | 1 | 1 | 1 | — |
| Pore Volume Ratio | 1.10 | 1.36 | 0.76 | 0.80 | 1.40 | 1.25 | 0.73 |
| Surface Roughness[(5)] (nm) | $5.8 \times 10^2$ | $4.4 \times 10^2$ | $6.1 \times 10^2$ | $5.3 \times 10^2$ | $6.2 \times 10^2$ | $5.5 \times 10^2$ | $6.4 \times 10^2$ |
| Electrolytic Solution Absorption Speed | 3.9 | 3.8 | 4.1 | 4 | 4.2 | 4.1 | 4.1 |
| Thickness Variation Ratio After Heat Compression (%) | −15 | −11 | −19 | −16 | −10 | −18 | −17 |
| Air Permeability After Heat Compression (sec/100 cm³) | 542 | 545 | 465 | 495 | 515 | 532 | 485 |

TABLE 1-continued

| | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Polyolefin | | | | | | | |
| UHMWPE Mw[(1)]/MWD[(2)]/% by mass | $2.0 \times 10^6$/8/20 | $2.0 \times 10^6$/8/2 | $2.0 \times 10^6$/8/3 | $2.0 \times 10^6$/8/20 | $2.0 \times 10^6$/8/2 | $2.0 \times 10^6$/8/2 | $2.0 \times 10^6$/8/2 |
| HDPE Mw/MWD/% by mass | $3.5 \times 10^5$/8.6/80 | $3.5 \times 10^5$/8.6/98 | $3.5 \times 10^5$/8.6/97 | $3.5 \times 10^5$/8.6/80 | $2.0 \times 10^5$/8.9/98 | $2.0 \times 10^5$/8.9/98 | $2.5 \times 10^5$/8.9/98 |
| PP Mw/% by mass | —/— | —/— | —/— | —/— | —/— | —/— | —/— |
| PE (Composition) Tm(° C.)[(3)]/Tcd (° C.)[(4)]/MWD | 135/100/14.4 | 135/100/10.0 | 135/100/10.5 | 135/100/14.4 | 135/100/10.1 | 135/100/10.1 | 135/100/10.0 |
| Production Conditions | | | | | | | |
| Polyolefin Concentration (% by mass) | 30 | 30 | 30 | 30 | 40 | 40 | 40 |
| Stretching of Gel-Like Sheet | | | | | | | |
| Temperature (° C.) | 115 | 118 | 115 | 118 | 125[(6)] | 119 | 119 |
| Magnification (MD × TD) | 5 × 5 | 5 × 5 | 5 × 5 | 5 × 5 | 5 × 5 | 5 × 5 | 5 × 5 |
| Heat-Setting of Stretched Gel-Like Sheet - Temp.(° C.)/Time (sec.) | —/— | —/— | —/— | —/— | —/— | —/— | —/— |
| Heat-Setting of Microporous Membrane Containing Washing Solvent Temperature (° C.)/Time (second) | 126.8/10 | —/— | —/— | —/— | —/— | —/— | —/— |
| Stretching of Microporous Membrane Temp. (° C.)/Direction/Magnification (folds) | —/— | —/— | 130/TD/2.0 | 130/TD/1.4 | —/— | 129.5/TD/1.4 | 115/TD/1.4 |
| Heat-Setting of Microporous Membrane Temp.(° C.)/Time (sec.) | —/— | 128/10 | 126/30 | 130/30 | —/— | 120/30 | 134/30 |
| Properties of Microporous Membrane | | | | | | | |
| Average Thickness (μm) | 20.1 | 20.8 | 16.8 | 20.3 | — | 20.4 | 20.4 |
| Air Permeability (sec/100 cm³/20 μm) | 425 | 181 | 115 | 255 | — | 60 | —[(7)] |
| Porosity (%) | 38 | 41 | 48.7 | 38.8 | — | 63 | — |
| Pin Puncture Strength (mN/20 μm) | 4,900 | 2,891 | 4,998 | 4,753 | — | 2,646 | — |
| Tensile Rupture Strength (kPa) MD | 148,960 | 90,160 | 99,960 | 119,560 | — | 50,960 | — |
| TD | 124,460 | 77,420 | 181,300 | 140,140 | — | 79,772 | — |
| Tensile Rupture Elongation (%) MD | 145 | 160 | 175 | 160 | — | 190 | — |
| TD | 220 | 280 | 90 | 110 | — | 135 | — |
| Heat Shrinkage Ratio (%) MD | 5.0 | 3.0 | 2.8 | 1.5 | —/— | 12 | —/— |
| TD | 4.5 | 3.2 | 5.5 | 2.2 | | 11 | |
| Higher-Order Structure First Peak (μ) | 0.04 | 0.05 | 0.1 | 0.05 | — | 0.1 | — |
| Second Peak (μm) | — | — | — | — | — | — | — |
| Third Peak (μm) | — | — | — | — | — | — | — |
| Fourth Peak (μm) | — | — | — | — | — | — | — |
| Pore Volume Ratio | — | — | — | — | — | — | — |

TABLE 1-continued

| | | | | | | |
|---|---|---|---|---|---|---|
| Surface Roughness[5] (nm) | $2.1 \times 10^2$ | $1.9 \times 10^2$ | $1.8 \times 10^2$ | $2.5 \times 10^2$ | — | $6.4 \times 10^2$ |
| Electrolytic Solution Absorption Speed | 1 | 1.5 | 1.8 | 1.2 | — | 3.5 |
| Thickness Variation Ratio After Heat Compression (%) | −20 | −22 | −20 | −15 | — | −30 |
| Air Permeability After Heat Compression (sec/100 cm³) | 962 | 720 | 485 | 688 | — | 450 |

Note:
[1]Mw represents a weight-average molecular weight;
[2]MWD represents a molecular weight distribution;
[3]Tm represents the melting point of the polyethylene(composition);
[4]Tcd represents the crystal dispersion temperature of the polyethylene (composition);
[5]Surface roughness (maximum height difference) measured by AFM in a dynamic force mode (DFM);
[6]The gel-like sheet was broken; and
[7]The microporous membrane did not have air permeability.

As is shown in Table 1, each microporous membrane of Examples 1-7 are characterized by a hybrid structure, i.e., in the curve of differential pore volume $$\frac{dVp}{d\mathrm{Log}(r)}$$

shows the presence of a significant number of pores with pore sizes between 100 nm and 1000 nm. Moreover, as can be seen from FIGS. 1 and 2, the fraction of the area under the curve from a pore diameter of about 100 nanometers to about 1,000 nanometers is 25% or more of the total area under that curve for pore diameters of from about 10 nanometers to about 1,000 nanometers. The membrane of Comparative Example 2 does not have a hybrid structure, and the fraction of the area under the curve from a pore diameter of about 100 nanometers to about 1,000 nanometers is significantly less than 20% of the total area under that curve for pore diameters of from about 10 nanometers to about 1,000 nanometers, as shown by FIG. 3.

The microporous membranes of Examples 1-7 have suitable air permeability, pin puncture strength, tensile rupture strength, tensile rupture elongation and heat shrinkage resistance, as well as suitable electrolytic solution absorption, with little variation of thickness and air permeability after heat compression.

Comparative Example 1 did not perform as well as those of Examples 1-7 in air permeability, air permeability after heat compression, and electrolytic solution absorption. It is believed that this is the case because the microporous membrane of Comparative Example 1 was obtained from a polyethylene composition containing more than 7% by mass of UHMWPE.

Comparative Example 2 did not perform as well as those of Examples 1-7 in pin puncture strength, air permeability after heat compression and electrolytic solution absorption. It is believed that this is the case because the microporous membrane was not stretched.

The membranes of Comparative Examples 3 and 4 did not perform as well as those of Examples 1-7 in electrolytic solution absorption. It is believed that this is the case because the stretching magnification of the microporous membrane was more than 1.8 fold in Comparative Example 3, and because a polyethylene composition containing more than 7% by mass of UHMWPE was used in Comparative Example 4.

The microporous membrane of Comparative Example 6 did not perform as well as those of Examples 1-7 in pin puncture strength, tensile rupture strength, tensile rupture elongation and heat shrinkage resistance. It is believed that this is the case because the gel-like sheet had too high a stretching temperature, and because the heat-setting temperature was lower than the stretching temperature of the microporous membrane −5° C.

FIG. 6 shows the differential pore volume curve for a microporous membrane (comparative example) that does not have a hybrid structure. The membrane contains 30% by mass of ultra-high molecular weight polyethylene and 70% by mass of high density polyethylene. In manufacturing this membrane the cooled extrudate was biaxially stretched at a temperature of 95° C., but the membrane was not subjected to a second stretching step. The total area under the $$\frac{dVp}{d\mathrm{Log}(r)}$$

differential pore volume curve from 1 nm to 1000 nm is 0.56. The area under the curve from 100 nm to 1000 nm is 0.13. The ratio of these areas is about 0.23, so about 23% of the area under the curve is associated with pores in the size range of 100 nm to 1000 nm.

FIG. 7 shows the differential pore volume curve for a microporous membrane that has a hybrid structure. The membrane contains 2% by mass of ultra-high molecular weight polyethylene and 93% by mass of high density polyethylene, and 5% polypropylene. In manufacturing this membrane the cooled extrudate was biaxially stretched at a temperature of 95° C., and the membrane was subjected to a second stretching step at a stretching magnification of 1.4. The heat setting temperature was 127.5° C.

What is claimed is:

1. A microporous membrane consisting of polyethylene, the microporous membrane having a differential pore volume curve with an area under the curve over the range of pore sizes of from about 100 nm to about 1,000 nm that is 25% or more of a total area under the curve over the range of pore sizes of from about 10 nm to about 1,000 nm, a surface roughness of 0.3 to 0.62 μm.

2. The microporous membrane of claim 1, wherein the polyethylene consists of (a) a first polyethylene having a weight average molecular weight of from $1 \times 10^4$ to $5 \times 10^5$ and (b) from about 2% by mass to about 7% by mass of a second polyethylene having a weight average molecular weight of greater than $5 \times 10^5$, the mass percents being based on the mass of the microporous membrane.

3. The microporous membrane of claim 2, wherein the first polyethylene is a high density polyethylene having a molecular weight distribution of from about 5 to about 100, and wherein the second polyethylene is an ultra-high molecular weight polyethylene having a weight average molecular weight that is greater than $1 \times 10^6$.

4. The microporous membrane of claim 1 characterized by a normalized electrolytic solution absorption speed of at least about 3.8.

5. The microporous membrane of claim 1, having an average thickness of about 10 to about 100 micrometers, a shutdown temperature in the range of about 130° C. to about 140° C., a meltdown temperature in the range of about 145° C. to about 190° C., a tensile rupture strength of about 90,000 kPa or more, and a porosity of about 40% or more.

6. A multi-layer microporous membrane having a first layer comprising the microporous membrane of claim 1, and at least a second layer.

7. A multi-layer microporous membrane having (a) a first layer and a third layer comprising the microporous membrane of claim 1, the first and third layers being surface layers of the multilayer microporous membrane, and (b) at least a second layer situated between the first and third layers.

8. A multi-layer microporous membrane having (a) a first layer and a third layer, the first and third layers being surface layers of the multilayer microporous membrane, and (b) at least a second layer comprising the microporous membrane of claim 1, with the second layer situated between the first and third layers.

9. A battery comprising an anode, a cathode, an electrolyte in contact with the anode and the cathode, and at least one separator situated between the anode and the cathode; the separator comprising the microporous membrane of claim 1.

10. A battery comprising an anode, a cathode, an electrolyte in contact with the anode and the cathode, and at least one separator situated between the anode and the cathode; the separator comprising the microporous membrane of claim 6.

\* \* \* \* \*